(12) United States Patent
Wu et al.

(10) Patent No.: US 10,386,526 B2
(45) Date of Patent: Aug. 20, 2019

(54) METHODS AND SYSTEMS FOR DETERMINING FORMATION PROPERTIES AND PIPE PROPERTIES USING RANGING MEASUREMENTS

(71) Applicant: Halliburton Energy Services, Inc., Houston, TX (US)

(72) Inventors: Hsu-Hsiang Wu, Sugar Land, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/542,784

(22) PCT Filed: Apr. 25, 2016

(86) PCT No.: PCT/US2016/029148
§ 371 (c)(1),
(2) Date: Jul. 11, 2017

(87) PCT Pub. No.: WO2017/188921
PCT Pub. Date: Nov. 2, 2017

(65) Prior Publication Data
US 2019/0113648 A1    Apr. 18, 2019

(51) Int. Cl.
*G01V 3/22* (2006.01)
*G01V 3/26* (2006.01)
(Continued)

(52) U.S. Cl.
CPC .............. *G01V 3/22* (2013.01); *E21B 41/00* (2013.01); *E21B 44/00* (2013.01); *E21B 47/00* (2013.01); *E21B 47/122* (2013.01); *G01V 3/26* (2013.01)

(58) Field of Classification Search
CPC .............. G01V 3/18; G01V 3/20; G01V 3/26
See application file for complete search history.

(56) References Cited

U.S. PATENT DOCUMENTS 6,166,540 A  *  12/2000  Wollin ................ G01N 24/081
                                                    324/300
7,703,548 B2     4/2010  Clark
(Continued)

FOREIGN PATENT DOCUMENTS

GB          2492666 A      1/2013
WO     WO 2009/126376 A2   10/2009

OTHER PUBLICATIONS

Grills, "Magnetic Ranging Technologies for Drilling Steam Assisted Gravity Drainage Well Pairs and Unique Well Geometries—A Comparison of Technologies," *SPE International Thermal Operations and Heavy Oil Symposium and International Horizontal Well Technology Conference*, Nov. 4-7, 2002, Calgary, Alberta, Canada.

(Continued)

*Primary Examiner* — Tung X Nguyen
(74) *Attorney, Agent, or Firm* — Haynes and Boone, LLP

(57) ABSTRACT

Methods and systems are presented in this disclosure for estimation of formation properties and pipe properties using ranging measurements. Embodiments of the present disclosure utilize ranging measurements to first determine a defined slope (e.g., leakage rate) of an electrical current signal flowing along a wellbore. The determined slope (e.g., leakage rate) may be then used to estimate properties of a formation surrounding the wellbore (e.g., formation resistivity) and properties of a conductive material (casing pipe) deployed in the wellbore (e.g., pipe resistance). Based on the estimated properties of the formation and the conductive material, drilling operation in a drilling well can be adjusted, and repair of defects or mechanical deformations on the casing pipe can be initiated.

21 Claims, 15 Drawing Sheets

(51) Int. Cl.
      *E21B 47/12*       (2012.01)
      *E21B 41/00*       (2006.01)
      *E21B 44/00*       (2006.01)
      *E21B 47/00*       (2012.01)

(56) References Cited

U.S. PATENT DOCUMENTS

| | | |
|---|---|---|
| 7,795,872 B2 | 9/2010 | Clark et al. |
| 2008/0041626 A1 | 2/2008 | Clark |
| 2010/0155139 A1* | 6/2010 | Kuckes ............ E21B 47/02216 |
| | | 175/45 |
| 2012/0067644 A1 | 3/2012 | Goswami et al. |
| 2013/0173164 A1 | 7/2013 | Zhang |
| 2013/0333946 A1* | 12/2013 | Sugiura ................ E21B 44/00 |
| | | 175/24 |
| 2014/0069721 A1 | 3/2014 | Clark et al. |
| 2014/0121971 A1 | 5/2014 | Hanak et al. |

OTHER PUBLICATIONS

International Search Report and the Written Opinion of the International Search Authority, or the Declaration, dated Jan. 18, 2017, PCT/US2016/029148, 16 pages, ISA/KR.

* cited by examiner

METHODS AND SYSTEMS FOR DETERMINING FORMATION PROPERTIES AND PIPE PROPERTIES USING RANGING MEASUREMENTS

PRIORITY

The present application is a U.S. National Stage patent application of International Patent Application No. PCT/US2016/029148, filed on Apr. 25, 2016, the benefit of which is claimed and the disclosure of which is incorporated herein by reference in its entirety.

TECHNICAL FIELD

The present disclosure generally relates to wellbore ranging measurements and, more particularly, to methods and systems for determining formation properties and pipe properties using ranging measurements.

BACKGROUND

Certain techniques have been developed to extract hydrocarbons that involve drilling a wellbore in close proximity to one or more existing wells. Examples of directed drilling near an existing well include well intersection for blowout control, multiple wells drilled from an offshore platform, and closely spaced wells for geothermal energy recovery. Another such technique is steam-assisted gravity drainage (SAGD) that uses a pair of vertically-spaced, horizontal wells constructed along a substantially parallel path, often less than ten meters apart. Careful control of the spacing contributes to the effectiveness of the SAGD technique.

Several methods have been developed for use in SAGD applications to utilize electrical currents along a target well (existing cased-hole well) in order to achieve range determination. Such ranging service provides distance and direction between the target well and a drilling well (ranging well). The goal is to range a wellbore of the drilling well to an optimized position relative to the target well. For example, gradient sensors implemented in the wellbore of the drilling well have been proposed to provide distance and direction of the target well without knowing amplitudes of electrical current signals in the target well.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

DETAILED DESCRIPTION

Figure 1:
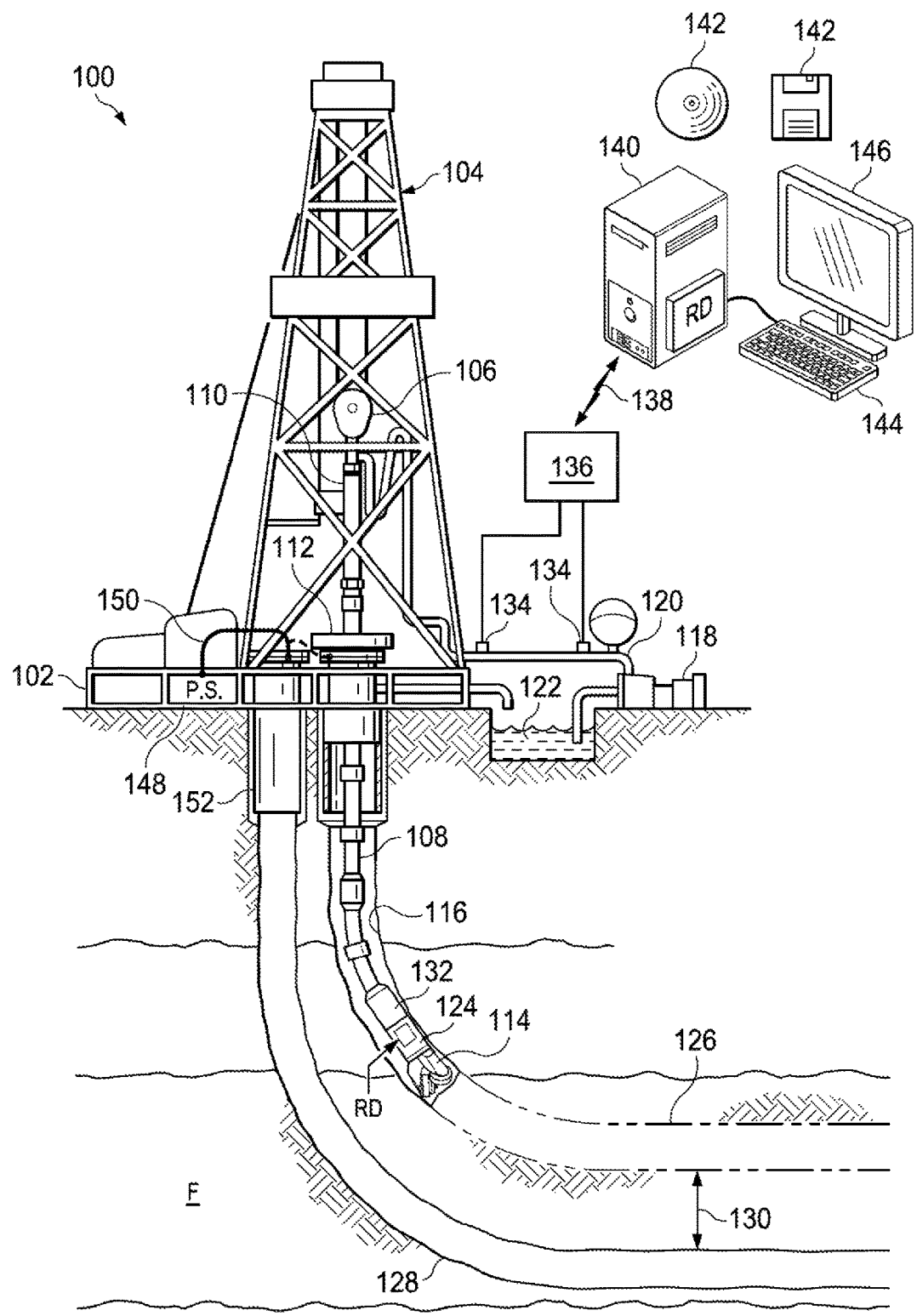
FIG. 1 is an example drilling environment in which ranging embodiments may be employed, according to certain illustrative embodiments of the present disclosure.

Embodiments of the present disclosure relate to methods and systems for determining, based on ranging measurements, properties of a formation (e.g., formation resistivity) surrounding a target well (e.g., cased-hole well) and/or properties of a conductive material (e.g., resistance of a casing pipe) deployed in the target well. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one ordinarily skilled in the art to implement such feature, structure, or characteristic in connection with other embodiments whether or not explicitly described. It would also be apparent to one ordinarily skilled in the relevant art that the embodiments, as described herein, can be implemented in many different embodiments of software, hardware, firmware, and/or the entities illustrated in the Figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

The disclosure may repeat reference numerals and/or letters in the various examples or Figures. This repetition is for the purpose of simplicity and clarity and does not in itself dictate a relationship between the various embodiments and/or configurations discussed. Further, spatially relative terms, such as beneath, below, lower, above, upper, uphole, downhole, upstream, downstream, and the like, may be used herein for ease of description to describe one element or feature's relationship to another element(s) or feature(s) as illustrated, the upward direction being toward the top of the corresponding Figure and the downward direction being toward the bottom of the corresponding Figure, the uphole direction being toward the surface of the wellbore, the downhole direction being toward the toe of the wellbore. Unless otherwise stated, the spatially relative terms are intended to encompass different orientations of the apparatus in use or operation in addition to the orientation depicted in the Figures. For example, if an apparatus in the Figures is turned over, elements described as being "below" or "beneath" other elements or features would then be oriented "above" the other elements or features. Thus, the exemplary term "below" can encompass both an orientation of above and below. The apparatus may be otherwise oriented (rotated 90 degrees or at other orientations) and the spatially relative descriptors used herein may likewise be interpreted accordingly.

Moreover even though a Figure may depict a horizontal wellbore or a vertical wellbore, unless indicated otherwise, it should be understood by those ordinarily skilled in the art that the apparatus according to the present disclosure is equally well suited for use in wellbores having other orientations including vertical wellbores, slanted wellbores, multilateral wellbores or the like. Likewise, unless otherwise noted, even though a Figure may depict an offshore operation, it should be understood by those ordinarily skilled in the art that the apparatus according to the present disclosure is equally well suited for use in onshore operations and vice-versa. Further, unless otherwise noted, even though a Figure may depict a cased hole, it should be understood by those ordinarily skilled in the art that the apparatus according to the present disclosure is equally well suited for use in open hole operations.

Illustrative embodiments and related methods of the present disclosure are described below in reference to FIGS. 1-12 as they might be employed for determining, based on ranging measurements, properties of a formation (e.g., formation resistivity) surrounding a target well (e.g., cased-hole well) and/or properties of a conductive material (e.g., resistance of a casing pipe) deployed in the target well. Such embodiments and related methods may be practiced, for example, using a computer system as described herein. Other features and advantages of the disclosed embodiments will be or will become apparent to one of ordinary skill in the art upon examination of the following Figures and detailed description. It is intended that all such additional features and advantages be included within the scope of the disclosed embodiments. Further, the illustrated Figures are only illustrative and are not intended to assert or imply any limitation with regard to the environment, architecture, design, or process in which different embodiments may be implemented.

Embodiments of the present disclosure utilize ranging measurements to first determine a defined slope (e.g., leakage rate) of an electrical current signal flowing along a target well (e.g., cased-hole well). The determined slope (e.g., leakage rate) may be then used to estimate certain properties of a formation surrounding the target well (e.g., formation resistivity) and/or certain properties of a casing pipe deployed in the target well (e.g., resistance per unit length, thickness, conductivity, magnetic permeability, and the like). The slope (e.g., leakage rate) of the electrical current flowing along the target well may vary with respect to several factors including formation resistivity, mud resistivity and pipe properties (e.g., resistance and permeability). Therefore, in one or more embodiments, the slope (e.g., leakage rate) of the electrical current flowing along the target well can be utilized to determine corresponding formation resistivity, if pipe properties and mud resistivity are known (e.g., mud resistivity may be measured by resistivity tools). In one or more other embodiments, the slope (e.g., leakage rate) of the electrical current flowing along the target well can be used to estimate corresponding pipe properties, if both formation and mud resistivities are known (e.g., measured by resistivity tools). In one or more other embodiments, as discussed in more detail below, based on a plurality of measured slopes related to a plurality of operating frequencies of an electrical current flowing along the target well, both formation and pipe properties may be estimated simultaneously. Several modeling examples are disclosed herein to validate the presented methods and systems for determining formation properties and pipe properties using magnetic ranging measurements.

Magnetic ranging has been widely used for various applications, including well intersection, well avoidance, steam-assisted gravity drainage (SAGD), and others. One excitation method for magnetic ranging is surface excitation. Surface excitation is a popular method of generating a ranging signal. It is relatively easy to implement, without the need for complex cabling and equipment. When surface excitation is used, an electrical current is injected into a target well casing at the surface of the well (e.g., at the well head). The electrical current travels along the casing downhole and generates a magnetic field downhole that originates from the target well via direct transmission, and can be measured at a distance (e.g., in a drilling well) for ranging purposes.

FIG. 1 depicts an example drilling environment 100 in which ranging embodiments may be employed. The disclosed apparatus (e.g., logging tools), systems, and methods are best understood in the context of the larger systems in which they operate. Accordingly, FIG. 1 illustrates an example drilling environment 100 in which a drilling platform 102 supports a derrick 104 having a traveling block 106 for raising and lowering a drill string 108. A top drive 110 supports and rotates the drill string 108 as it is lowered through the well-head 112. A drill bit 114 is driven by a downhole motor and/or rotation of the drill string 108. As the drill bit 114 rotates, it creates a wellbore 116 that passes through various formations F. A pump 118 circulates drilling fluid through a feed pipe 120 to top drive 110, downhole through the interior of drill string 108, through orifices in drill bit 114, back to the surface via the annulus around drill string 108, and into a retention pit 122. The drilling fluid transports cuttings from the wellbore into the retention pit 122 and aids in maintaining the wellbore integrity.

The drill bit 114 is just one piece of a bottom-hole assembly that includes one or more drill collars (comprising thick-walled steel pipe) to provide weight and rigidity to aid the drilling process. Some of these drill collars include logging instruments to gather measurements of various drilling parameters such as position, orientation, weight-on-bit, wellbore diameter, etc. The tool orientation may be specified in terms of a tool face angle (also known as rotational or azimuthal orientation), an inclination angle (the slope), and a compass direction, each of which can be derived from measurements made by magnetometers, inclinometers, and/or accelerometers, though other sensor types such as gyroscopes may also be used. In one specific embodiment, the tool includes a three-axis fluxgate magnetometer and a three-axis accelerometer. As is known in the art, the combination of these two sensor systems enables the measurement of the tool face angle, inclination angle, and compass direction. In some embodiments, the tool face and hole inclination angles are calculated from the accelerometer sensor output, and the magnetometer sensor outputs are used to calculate the compass direction.

The bottom-hole assembly further includes a ranging tool 124 to receive signals from current injected by a power supply 148 into nearby conductors such as pipes, casing strings, and conductive formations and to collect measurements of the resulting field to determine distance and direction. Using measurements of these signals, in combination with the tool orientation measurements, the driller can, for example, steer the drill bit 114 along a desired path in the drilling well 126 relative to the existing well (e.g., target well) 128 in formation F using any one of various suitable directional drilling systems, including steering vanes, a "bent sub", and a rotary steerable system. For precision steering, the steering vanes may be the most useful steering mechanism. The steering mechanism can be controlled from the Earth's surface, or downhole, with a downhole controller programmed to follow the existing wellbore 128 at a predetermined distance 130 and position (e.g., directly above or below the existing wellbore). The ranging tool 124 may comprise one or more elements, that can be designated as receivers or sensors in this disclosure. These elements may comprise uniaxial, biaxial, or triaxial magnetometers, coil antennas, and/or telemetry receivers.

A telemetry sub 132 coupled to the downhole tools (including ranging tool 124) transmits telemetry data to the surface via mud pulse telemetry. A transmitter in the telemetry sub 132 modulates a resistance to drilling fluid flow to generate pressure pulses that propagate along the fluid stream at the speed of sound to the surface. One or more pressure transducers 134 convert the pressure signal into electrical signal(s) for a signal digitizer 136. It should be noted that other forms of telemetry exist and may be used to communicate signals from downhole to the digitizer. Such telemetry may include acoustic telemetry, electromagnetic telemetry, or telemetry via wired drill pipe.

The digitizer 136 supplies a digital form of the telemetry signals via a communications link 138 to a computer 140 or some other form of a data processing device. The computer 140 operates in accordance with software (which may be stored on non-transitory information storage media 142) and user input provided via an input device 144 to process and decode the received signals. The resulting telemetry data may be further analyzed and processed by the computer 140 to generate a display of useful information on a computer monitor 146 or some other form of a display device. For example, a driller could employ this system to obtain and monitor drilling parameters, formation properties, and the path of the borehole relative to the existing borehole 128 and any detected formation boundaries. A downlink channel can then be used to transmit steering commands from the surface to the bottom-hole assembly.

In some embodiments, the computer 140 has analog circuitry installed or is programmed to include a ranging determination module RD, which operates on the signal data received down hole at the ranging tool 124 to determine the distance and direction from the drilling well 126 to the target well 128. The ranging determination module RD may exist in the computer 140 as illustrated in FIG. 1. However, in alternative embodiments, computer 140 or some other data processing device, may be positioned on tool 124 or some other downhole tool to perform any of the methods described herein.

Thus, FIG. 1 illustrates an electromagnetic ranging system with surface excitation, in which embodiments of the present disclosure may be implemented. The power supply 148 at the surface employs a cable 150 to inject electrical current into target well casing 152 and flowing down-hole so that magnetic fields can be generated surrounding the target well 128. Then, sensors in the ranging tool 124 in the drilling well 126 can determine the magnetic field strength in various directions so that distance and direction between the target well 128 and drilling well 126 can be determined. The power supply 148 can also be connected to inject electrical current into the casing of the drilling well 126.

The drilling well 126 and the target well 128 are often constructed as a cased hole, with cement installed around the outside of the casing material (e.g., conductive piping). In the completion phase of oil and gas wells, the cement serves to isolate the wellbore, helps prevent casing failure, and keeps the wellbore fluids from contaminating freshwater aquifers.

Figure 2:
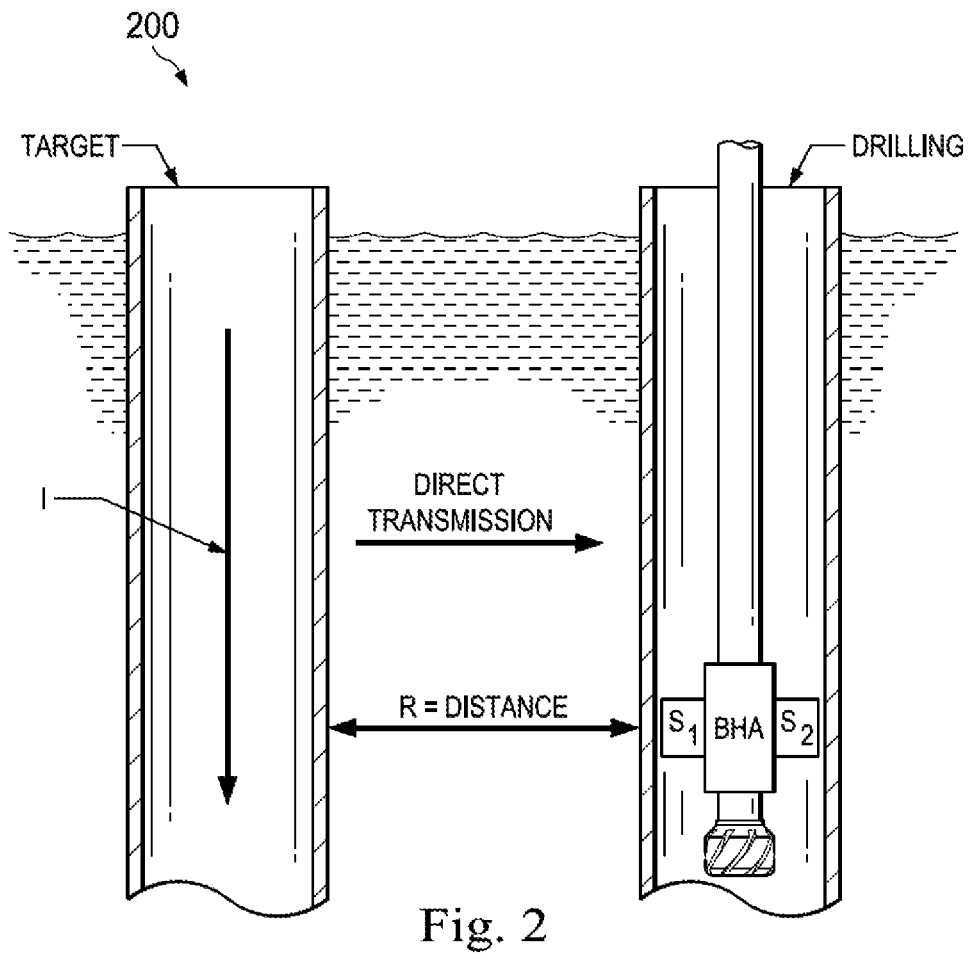
FIG. 2 is a block diagram of a well ranging system, according to certain illustrative embodiments of the present disclosure.

FIG. 2 is a block diagram of a well ranging system 200, according to certain illustrative embodiments of the present disclosure. As illustrated in FIG. 2, excitation electrical current I may be injected into a target well, while sensors S1, S2 configured to sense an electromagnetic field generated by the injected electrical current may be located in a drilling well, often attached to a bottom hole assembly (BHA). The sensors S1, S2 may operate to receive and measure the strength of an electromagnetic field that results from direct transmission from the target well. The sensors S1, S2 are utilized to detect the signals originating from the target well and thereafter determine relative ranging distance R and direction between the target well and the drilling well.

Figure 3:
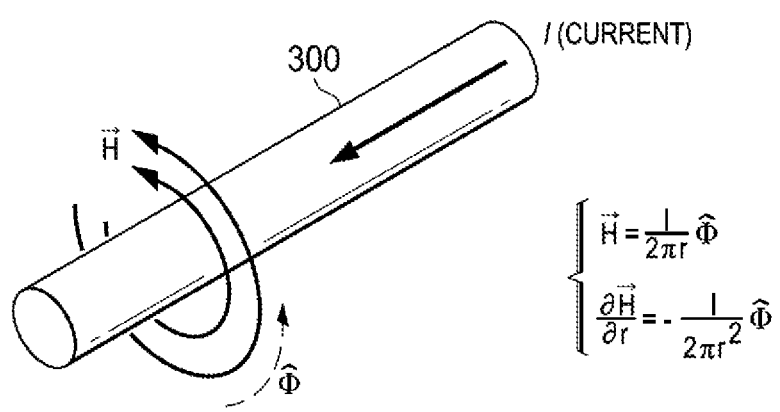
FIG. 3 is a schematic showing a magnetic field of an infinite line source, according to certain illustrative embodiments of the present disclosure.
Figure 4:
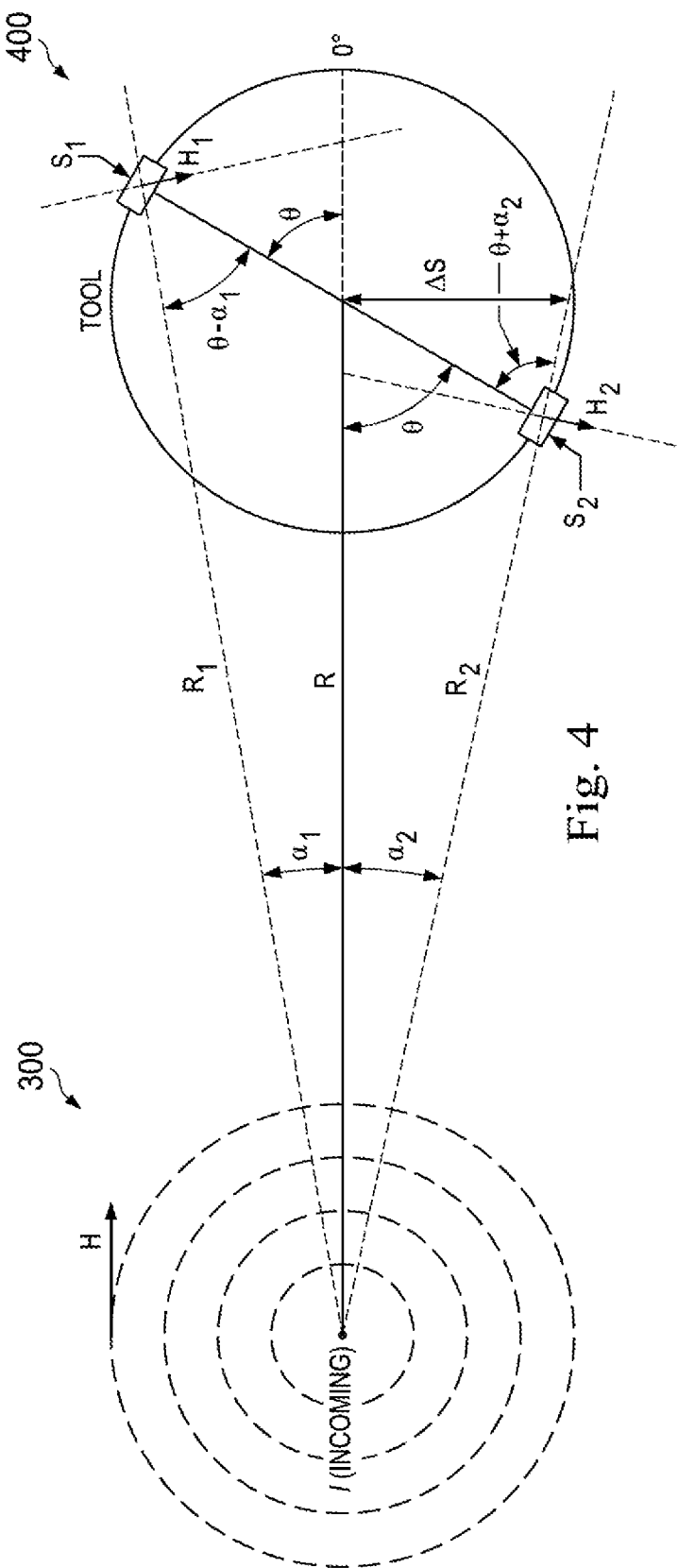
FIG. 4 is a schematic of an infinite line source and a logging tool equipped with two sensors for gradient field determination, according to certain illustrative embodiments of the present disclosure.

FIGS. 3 and 4 illustrate apparatus, methods, and system configurations for range determination, according to certain illustrative embodiments of the present disclosure. In FIG. 3, an infinite line source 300 with a constant electrical current I, is shown. Based on Ampere's law, the magnetic field H at low frequency surrounding the line source 300 can be expressed as $$\vec{H} = \frac{I}{2\pi r} \hat{\Phi}, \qquad (1)$$

where r is the distance between an observation point and the infinite line source 300 and $\hat{\Phi}$ is a magnetic flux produced by the infinite line source 300 with the electrical current I. In addition, the gradient field can be given by:

$$\frac{\partial \vec{H}}{\partial r} = -\frac{I}{2\pi r^2} \hat{\Phi}. \qquad (2)$$

Therefore, the distance r between the observation point and the infinite line source 300 can be directly computed by taking ratio of the amplitude of equation (1) to the amplitude of equation (2), given by:

$$\left| \frac{\vec{H}}{\frac{\partial \vec{H}}{\partial r}} \right| = \left| \frac{\frac{I}{2\pi r}}{\frac{-I}{2\pi r^2}} \right| = r. \qquad (3)$$

In FIG. 4, a block diagram of the infinite line source 300 from FIG. 3 and a logging tool 400 equipped with two sensors S1, S2 for gradient field determination can be seen. For example, the logging tool 400 may be deployed in a wellbore of a drilling well, and the goal is to range the drilling wellbore to a preferred position relative to a target well comprising at least a portion of the line source 300. In one or more embodiments, the tool 400 may correspond to the ranging tool 124 of the drilling environment 100 illustrated in FIG. 1. Equation (3) can be designated as the gradient method used to compute a ranging distance between wells. In practice, two sensors (e.g., magnetometers) S1, S2 may be used to compute magnetic field and gradient field measurements as shown in FIG. 4. A finite difference method is then utilized to calculate the magnetic field strength H and the gradient field strength, given by $$\vec{H} = \frac{\vec{H}_1 + \vec{H}_2}{2}, \text{ and} \qquad (4a)$$

$$\frac{\partial \vec{H}}{\partial r} = \frac{\vec{H}_1 - \vec{H}_2}{2\Delta S}, \qquad (4b)$$

where $H_1$ and $H_2$ are the total field measurements at sensor S1 and sensor S2, respectively, and $\Delta S$ is the separation between each sensor and the tool center. Therefore, equation (3) can be modified based on the finite difference method to compute the ranging distance r, as follows:

$$r = \left| \frac{\frac{\vec{H}_1 + \vec{H}_2}{2}}{\frac{\vec{H}_1 - \vec{H}_2}{2\Delta S}} \right|. \qquad (5)$$

In practice, a tool face or a reference point in a tool (e.g., sensor S1 location as tool reference point so that the tool face is θ in FIG. 4) varies while drilling. If sensor S1 does not lie on a straight line between the line source point and the tool center (i.e., tool face θ in FIG. 4 is not zero), and if vectors $\vec{H}_1$ and $\vec{H}_2$ are not tangential to the tool circumference, then equation (4) and equation (5) are not valid anymore. The tool face θ will affect total field strength and direction. Without taking this angle θ into consideration, the conventional gradient calculation will fail to calculate accurate ranging distance. Several methods have been proposed to achieve ranging determination (e.g., to compute ranging distance r) by taking the tool face into consideration.

Since ranging distance r can be computed based on magnetic field measurements, the corresponding electrical current signal flowing through a casing pipe of a target well can be also computed using equation (1). For simplicity, equation (1) can be modified as:

$$|\vec{H}| = \left| \frac{I}{2\pi r} \right|, \qquad (6)$$

where total magnetic field measurement $|\vec{H}|$ can be received and computed from sensors in a drilling well (e.g., the sensors S1 and S2 illustrated in FIG. 4), and the ranging distance r can be also computed using the gradient sensor configuration illustrated in FIG. 4. Therefore, amplitude of the electrical current I flowing through the casing pipe of the target well can be computed by $$|I| = |2\pi r| \times |\vec{H}| \qquad (7)$$

Equation (7) indicates that the amplitude of the electrical current flowing along the casing pipe of the target well can be also determined based on magnetic field signals of gradient sensor configuration illustrated in FIG. 4. Therefore, electrical current distribution along the casing pipe of the target well can be determined in real time, and thereby corresponding electrical current leakage along the casing pipe of the target well can be also calculated.

Figure 5A:
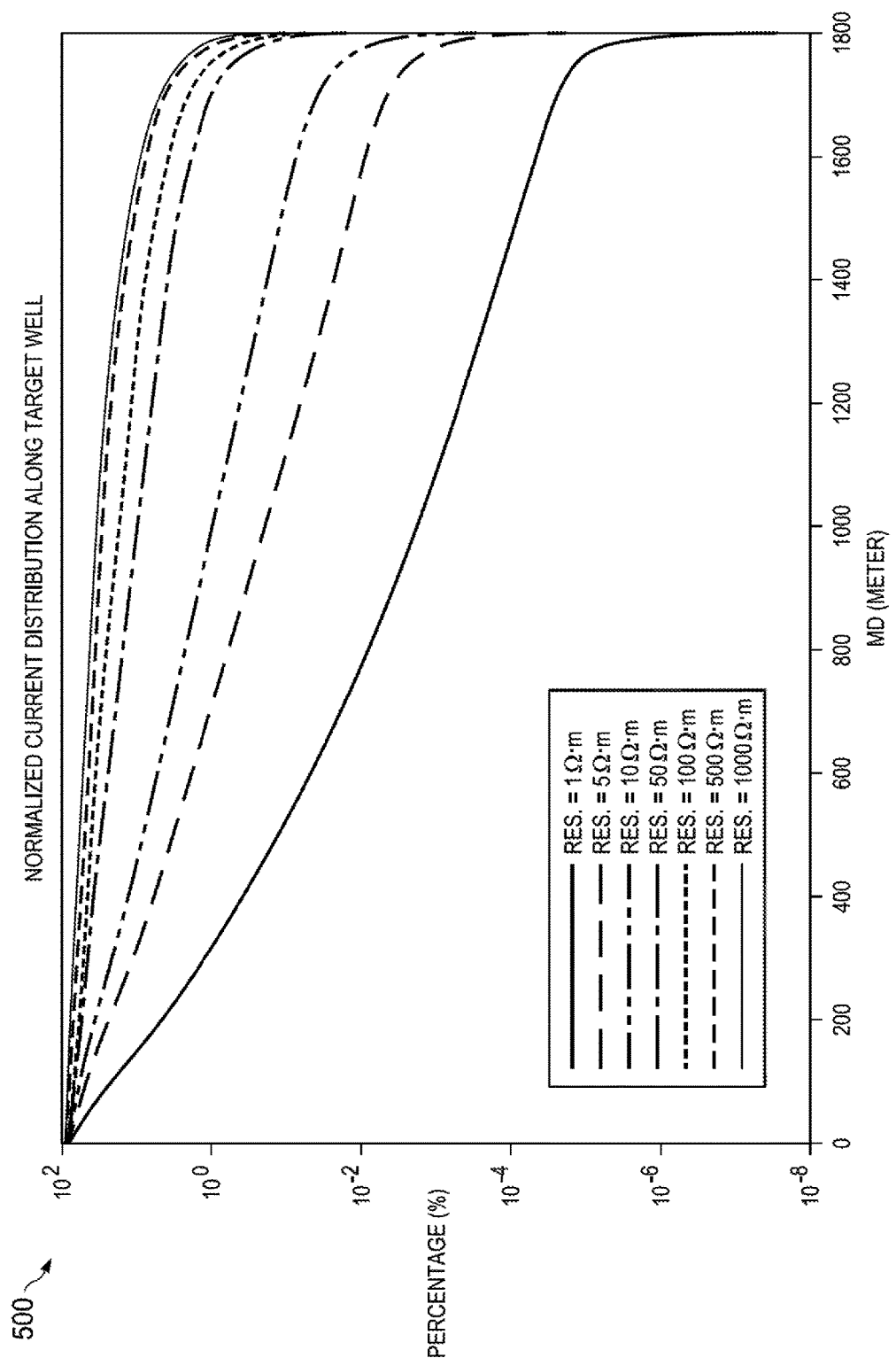
FIG. 5A is a graph showing normalized distribution of an electrical current flowing along a target well (e.g., cased-hole well) at operating frequency of 5 Hz for different resistivities of a formation surrounding the target well, according to certain illustrative embodiments of the present disclosure.
Figure 5B:
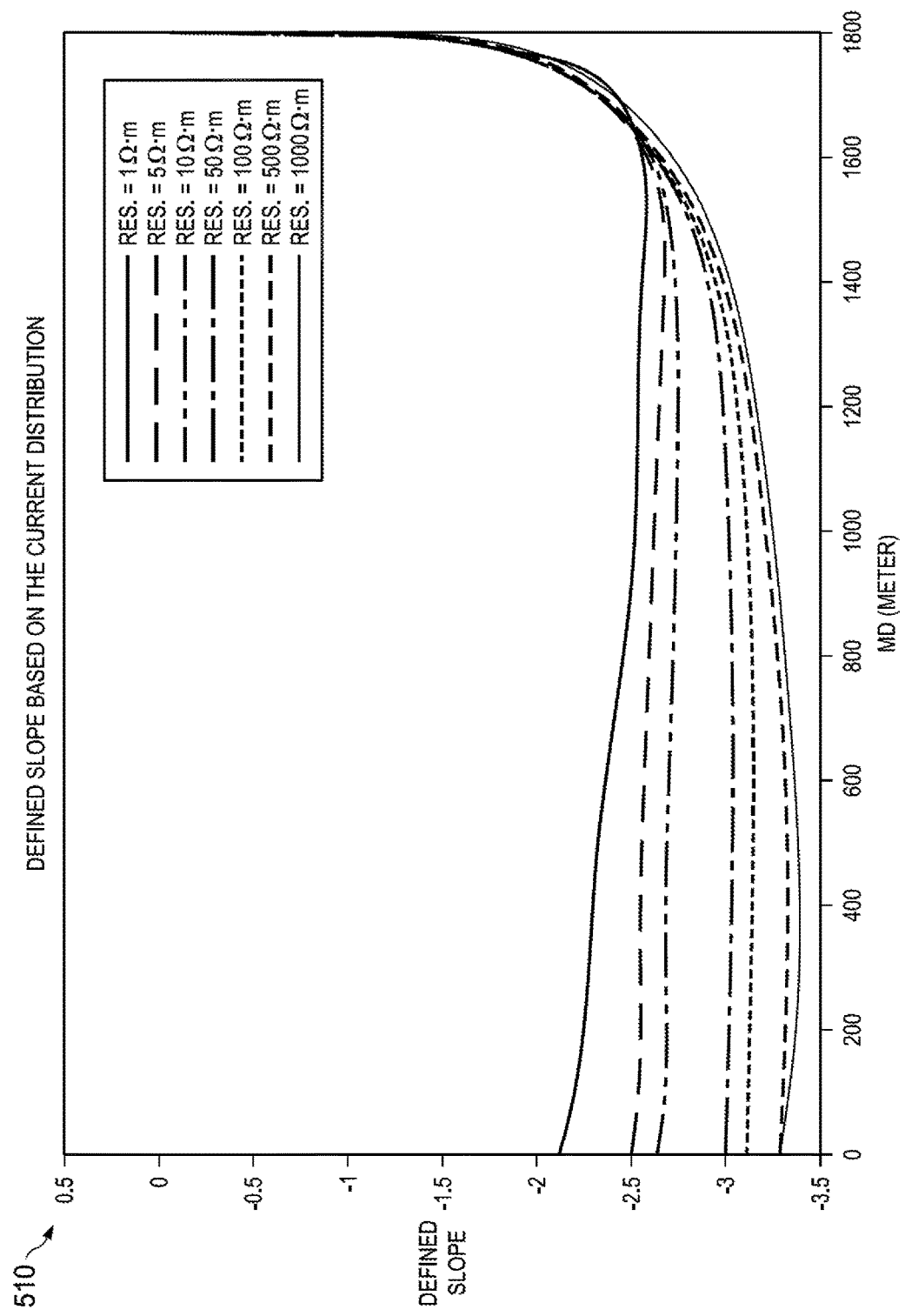
FIG. 5B is a graph showing defined slopes of an electrical current flowing along a target well (e.g., cased-hole well) at operating frequency of 5 Hz for different resistivities of a formation surrounding the target well, according to certain illustrative embodiments of the present disclosure.

FIGS. 5A-5B show modeling responses of electrical current distribution and leakage current rate distribution along a target well when surface excitation is applied to a wellhead of the target well, in accordance with illustrative embodiments of the present disclosure. In one or more embodiments, the modeling responses illustrated in FIGS. 5A-5B may be obtained by employing a modeling code stored in a non-transitory storage medium (e.g., non-transitory information storage media 142 of the drilling environment 100 illustrated in FIG. 1). The graph 500 of FIG. 5A shows the normalized electrical current distribution (e.g., normalized by a surface amplitude of an electrical current generated by a power supply located at a surface, such as the power supply 148 of the drilling environment 100 illustrated in FIG. 1) along the target well with respect to different formation resistivities. The graph 510 of FIG. 5B shows electrical current slopes (i.e., electrical current leakage rates) corresponding to the electrical current distribution shown in the graph 500 for different formation resistivities. The operating frequency of the electrical current is 5 Hz, the target well length is 1800 meters, and the casing conductivity is $10^6$ S.

In one or more embodiments, a defined slope, such as the defined slopes representing leakage rates for different formation resistivities illustrated in the graph 510 of FIG. 5B, can be defined by $$\text{Slope} = \log_{10}\left(\frac{\log_{10}(I(i)) - \log_{10}(I(i-1))}{MD(i) - MD(i-1)}\right), \quad (8a)$$

where I(n) is an amplitude of electrical current flowing through the casing pipe of the target well at a measure depth (MD) n. In one or more other embodiments, a frequency slope can be defined by $$\text{Slope} = \log_{10}\left(\frac{\log_{10}(I(i)) - \log_{10}(I(i-1))}{f(i) - f(i-1)}\right), \quad (8b)$$

where I(n) is an amplitude of electrical current flowing through the casing pipe of the target well having a frequency (f) n.

As shown in the graph 500 of FIG. 5A and in the graph 510 of FIG. 5B, at shallow depth range (e.g., well depths from 0 to 1000 meters), the slope (leakage rate) is flat and unique for a particular formation resistivity. After 1000 meters, the slope (leakage rate) still has a significant difference among low resistivity cases (e.g., less than 50 Ω·m) but becomes less sensitive for high resistivity cases (e.g., 50 Ω·m and larger). After 1600 meters, all resistivity cases illustrated in the graph 510 of FIG. 5B have very similar values of defined slope (leakage rate) due to so-called "end of pipe effect" where electrical current signal flowing along the casing pipe of the target well becomes very small when approaching the end of the target well. At the end of the cased-hole well, the discontinuity of pipe conductivity leads to significant decrease of the electrical current near the end of the well, which can be observed at the graph 500 of FIG. 5A.

For certain embodiments of the present disclosure, a defined slope (leakage rate) of an electrical current flowing along a wellbore of a target well penetrating a homogeneous reservoir formation, away from termination of pipe, surface and return electrode, can be calculated based on a magnitude of the electrical current given by:

$$I(z) = \exp\left(-z\sqrt{\frac{R_{pipe}}{R_f}}\right), \quad (9a)$$

where z is a measured depth of the wellbore, $R_{pipe}$ is a resistance per unit length of a casing pipe deployed in the wellbore, $R_f$ is a formation resistivity and I(z) is an electrical current magnitude as a function of the measured depth. For certain other embodiments, a frequency slope of an electrical current flowing along a wellbore of a target well penetrating a homogeneous reservoir formation, away from termination of pipe, surface and return electrode, can be calculated based on a magnitude of the electrical current as a function of frequency given by:

$$I(f) = \exp\left(-f\sqrt{\frac{\mu R_f}{R_{pipe}}}\right), \quad (9b)$$

where f is an operating frequency of the electrical current and μ is the magnetic permeability of the casing pipe.

Therefore, the method for determining the formation resistivity based directly on the slope of the electrical current flowing along the casing pipe of the target well is only applicable when the electrical current signal is far away from the end of the target well. In one or more embodiments, formation resistivity can be calculated based on an electrical current magnitude as a function of the measured depth defined by equation (9a) as:

$$R_f = \frac{R_{pipe}}{\left(\frac{\log(I(z_1)/I(z_2))}{z_1 - z_2}\right)^2}, \quad (10a)$$

where $I(z_1)$ is a magnitude of the electrical current for a first measure depth $z_1$, and $I(z_2)$ is a magnitude of the electrical current for a second measure depth $z_2$. Furthermore, the pipe resistance $R_{pipe}$ can be estimated in this case based on pipe conductivity, pipe permeability, pipe dimension, mud conductivity, and operating frequency in order to improve the formation resistivity calculation in equation (10a). In one or more other embodiments, formation resistivity can be calculated based on an electrical current magnitude as a function of the frequency defined by equation (9b) as:

$$R_f = \frac{1}{\mu}\left(R_{pipe}\frac{\log(I(f_1)/I(f_2))}{f_1 - f_2}\right)^2, \quad (10b)$$

where $I(f_1)$ is a magnitude of the electrical current for a first operating frequency of the electrical current $f_1$ and $I(f_2)$ is a magnitude of the electrical current for a second operating frequency of the electrical current $f_2$.

Figure 6A:
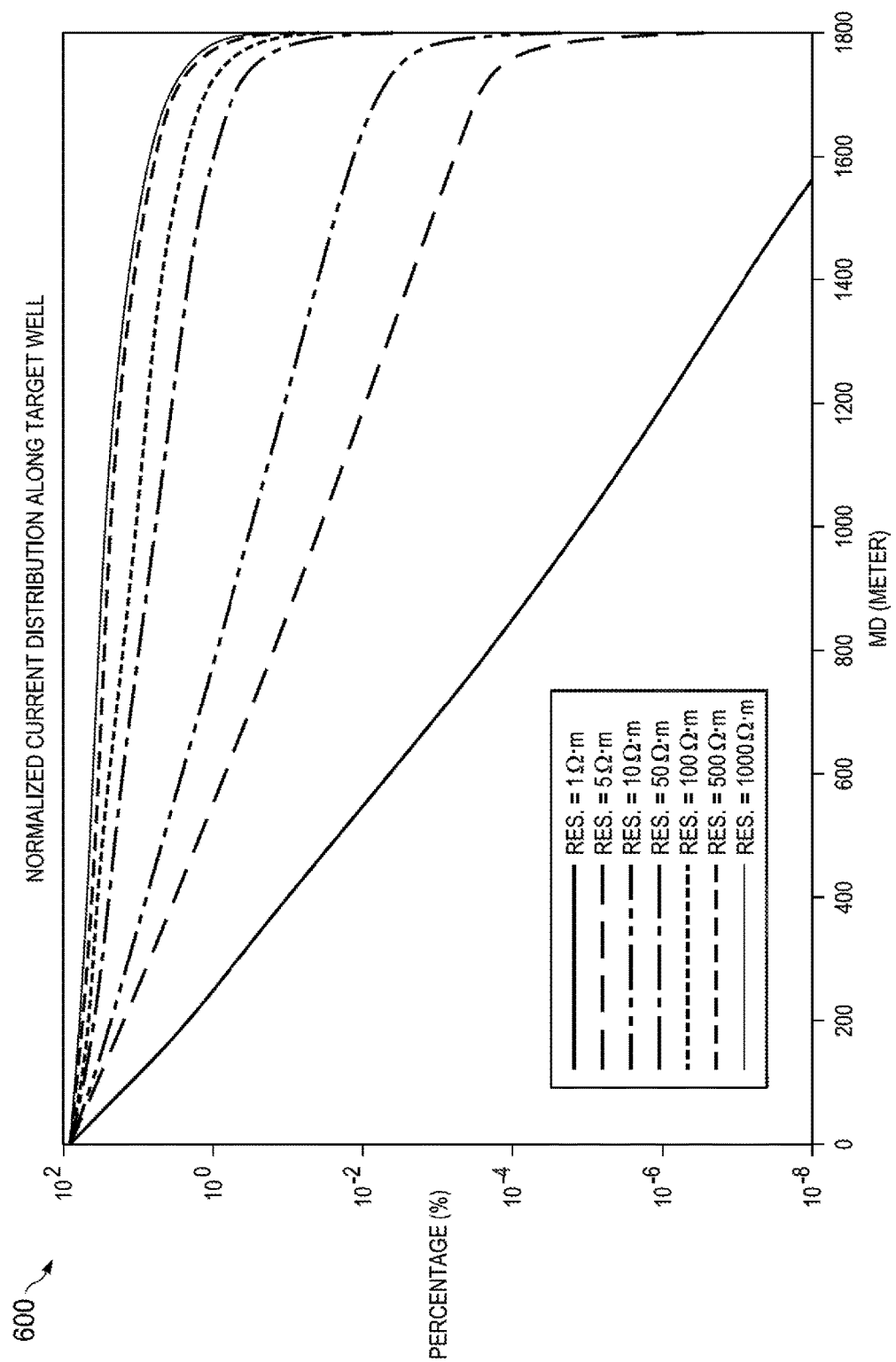
FIG. 6A is a graph showing normalized distribution of an electrical current flowing along a target well (e.g., cased-hole well) at operating frequency of 10 Hz for different resistivities of a formation surrounding the target well, according to certain illustrative embodiments of the present disclosure.
Figure 6B:
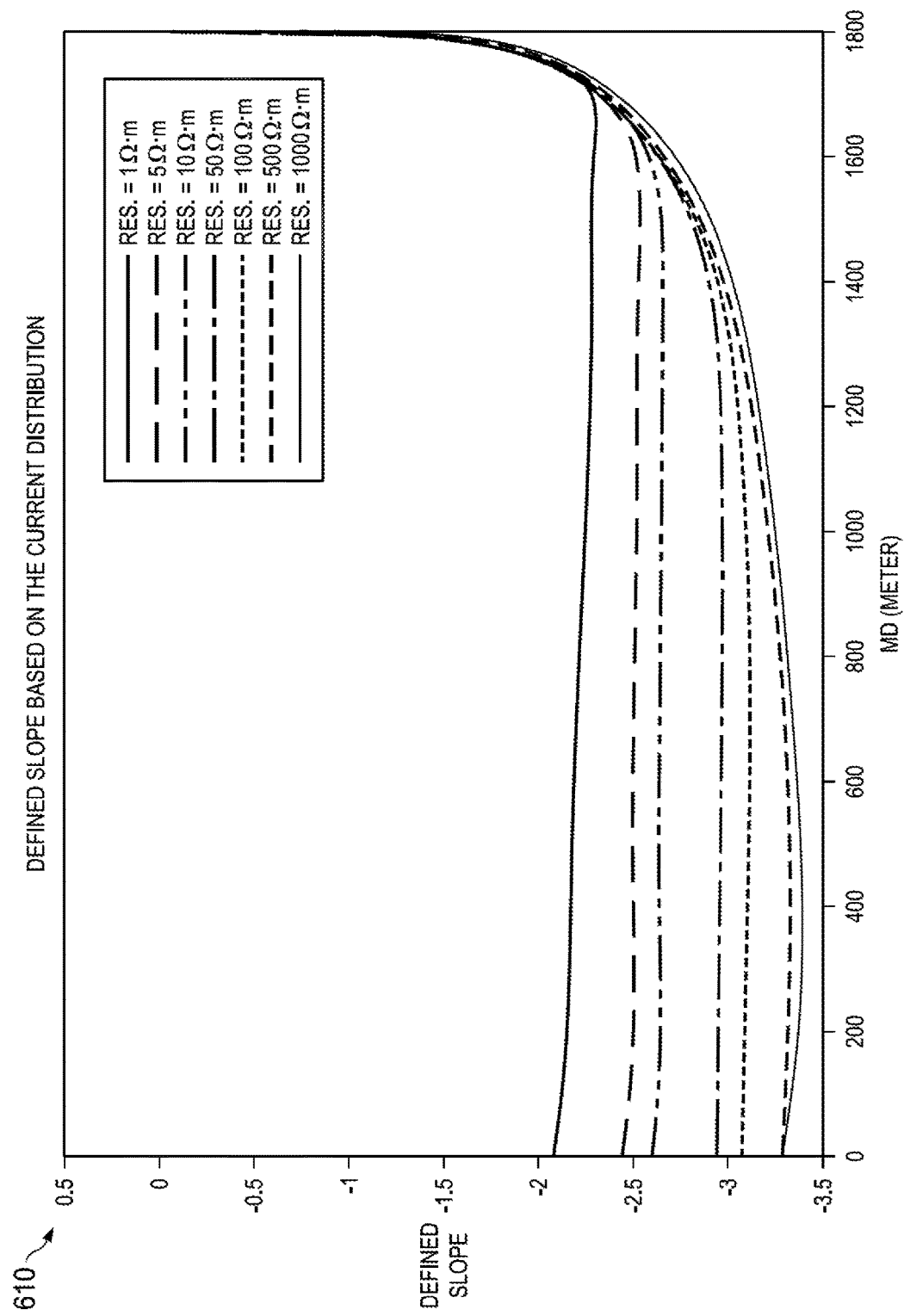
FIG. 6B is a graph showing defined slopes of an electrical current flowing along a target well (e.g., cased-hole well) at operating frequency of 10 Hz for different resistivities of a formation surrounding the target well, according to certain illustrative embodiments of the present disclosure.

In addition, owing to such low operating frequency (e.g., 5 Hz), sensitivity of the electrical current leakage rate (slope) to the formation resistivity drops whereas the formation resistivity increases. On the other hand, one can increase the operating frequency such that the current leakage rate (slope) can be more sensitive to formation resistivity changes. FIGS. 6A-6B show modeling responses of electrical current distribution and leakage current rate distribution along a target well when surface excitation is applied to a wellhead of the target well, in accordance with illustrative embodiments of the present disclosure. In one or more embodiments, the modeling responses illustrated in FIGS. 6A-6B may be obtained by employing a modeling code stored in a non-transitory storage medium (e.g., non-transitory information storage media 142 of the drilling environment 100 illustrated in FIG. 1). The same modeling parameters as in FIGS. 5A-5B are utilized in FIGS. 6A-6B, but for a different operating frequency of 30 Hz. The graph 600 of FIG. 6A shows the normalized electrical current distribution (e.g., normalized by a surface amplitude of an electrical current generated by a power supply located at a surface, such as the power supply 148 of the drilling environment 100 illustrated in FIG. 1) along the target well with respect to different formation resistivities. The graph 610 of FIG. 6B illustrates electrical current slopes (i.e., electrical current leakage rates) corresponding to the electrical current distribution shown in the graph 600 of FIG. 6A for different formation resistivities. As shown in the graph 610 of FIG. 6B, the slope (leakage rate) is more sensitive to different formation resistivity profiles, especially for low resistivity range, in comparison with the case when the operating frequency is 5 Hz illustrated the graph 510 of FIG. 5B.

Figure 7:
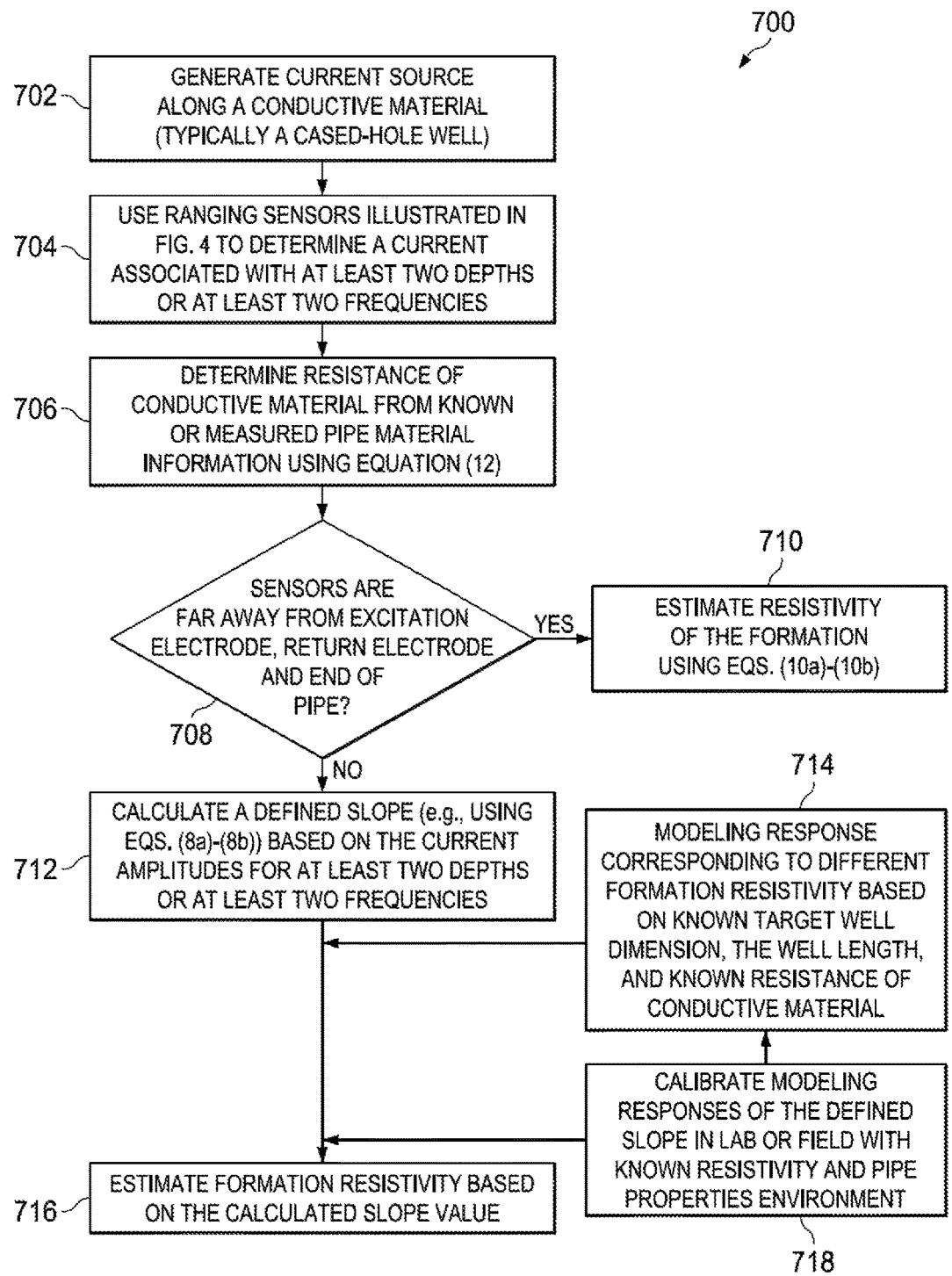
FIG. 7 is a flow chart of a method for decoupling properties of a formation (e.g., formation resistivity) surrounding a target well (e.g., cased-hole well) using ranging measurements, according to certain illustrative embodiments of the present disclosure.

FIG. 7 is a flow chart 700 of a method for decoupling formation resistivity properties using ranging measurements and a defined slope of an electrical current flowing along a conductive material (e.g., casing pipe) of a target well, according to certain illustrative embodiments of the present disclosure. At 702, using a current source, an electrical current signal may be generated that flows along a conductive material deployed in a target well (e.g., a casing pipe of the target well). For some illustrative embodiments, as discussed, the current source may be related to surface excitation, downhole excitation, BHA excitation, and the like, whereas the conductive material whose properties are being determined is associated with a cased-hole well, a drilling well with conductive BHA, and the like. At 704, ranging sensors attached to a ranging tool in the drilling well (e.g., sensors S1 and S2 illustrated in FIG. 4) may be used to determine amplitudes of an electrical current flowing along the conductive material deployed in the target well (e.g., casing pipe of the target well) for at least two depths of the target well or at least two frequencies. In one or more embodiments, two or more measurements of the electrical current amplitudes may be taken at a preferred distance between each other such that the electrical current leakage rate (e.g., the slope defined by equation (8a)) can be accurately calculated based on the measurements. In one or more other embodiments, two or more measurements of the electrical current amplitudes may be taken for a preferred set of operating frequencies such that a frequency slope (e.g., the slope defined by equation (8b)) can be accurately calculated based on the measurements. At 706, a resistance of the conductive material (e.g., casing pipe) may be determined from known or measured information associated with the conductive material (e.g., obtained using equation (12), as discussed in more detail below). At 708, it may be determined that sensor location is far away from the excitation electrode, return electrode and termination of the target well. Then, at 710, equation (10a) may be used to directly estimate formation resistivity based on the measured leakage rate of the electrical current flowing along the target well (determined from the amplitudes of the electrical current for the at least two depths of the target well). Alternatively, at 710, equation (10b) may be used to directly estimate formation resistivity based on the frequency slope of the electrical current flowing along the target well (determined from the amplitudes of the electrical current for the at least two operating frequencies).

However, if it is determined at 708 that the sensor location is closer to any electrode or termination of the pipe in the target well, equations (10a) and (10b) are not valid anymore. Then, at 712, equation (8a) may be used to calculate a defined slope (e.g., leakage current rate) based on the electrical current amplitudes measured for the at least two depths of the target well. Alternatively, at 712, equation (8b) may be used to calculate a frequency slope of the electrical current flowing along the conductive material deployed in the target well based on the electrical current amplitudes measured for the at least two frequencies of the electrical current. At 714, modeling code may be used to calculate modeling responses of the defined slope (e.g., distinct leakage current rates or distinct frequency slopes) with respect to different formation resistivities based on known properties of the conductive material (e.g., casing pipe) deployed in the target well (e.g., pipe size and length, pipe conductivity and permeability, and the like). At 716, the modeling responses of the defined slope obtained at 714 may be compared with the measurement calculations (e.g., the measured slope) obtained at 712 to estimate resistivity of a formation surrounding the target well. In one or more embodiments, an inversion method may be applied at 716 to accurately estimate the formation resistivity by matching the modeling responses obtained at 714 with the measurements obtained at 712. Additionally, at 718, lab data or field data may be used to calibrate the modeling responses of the defined slope in real-time processing and/or post-processing schemes with known formation resistivity and pipe properties.

Certain embodiments of the present disclosure relate to determining formation properties using ranging measurements based on surface excitation where an electrical current is injected to a wellhead of a target well. However, the method and system presented herein can be also applicable to any kind of excitation, including downhole excitation, BHA excitation, and the like, as long as electrical current signals flowing along a casing pipe of a target well are efficiently generated.

Certain embodiments of the present disclosure further utilize a defined slope (e.g., leakage rate) of an electrical current flowing along a target well to determine properties of a pipe (e.g., casing pipe) deployed in the target well, such as resistance per unit length, thickness, conductivity, magnetic permeability, and the like. In one or more embodiments, pipe property information can be used for inspection of defects or other mechanical deformations on pipes (e.g., buckling). The defined slope (e.g., leakage rate) of the electrical current flowing along the casing pipe of the target well may vary with respect to several factors, including formation resistivity, mud resistivity and pipe properties (e.g., resistance and permeability). Therefore, the defined slope (e.g., leakage rate) can be also utilized to determine corresponding pipe properties if both formation resistivity and mud resistivity are known (e.g., measured by resistivity tools). Several modeling examples are disclosed herein to validate the presented methods and systems for determining pipe properties using ranging measurements.

Figure 8A:
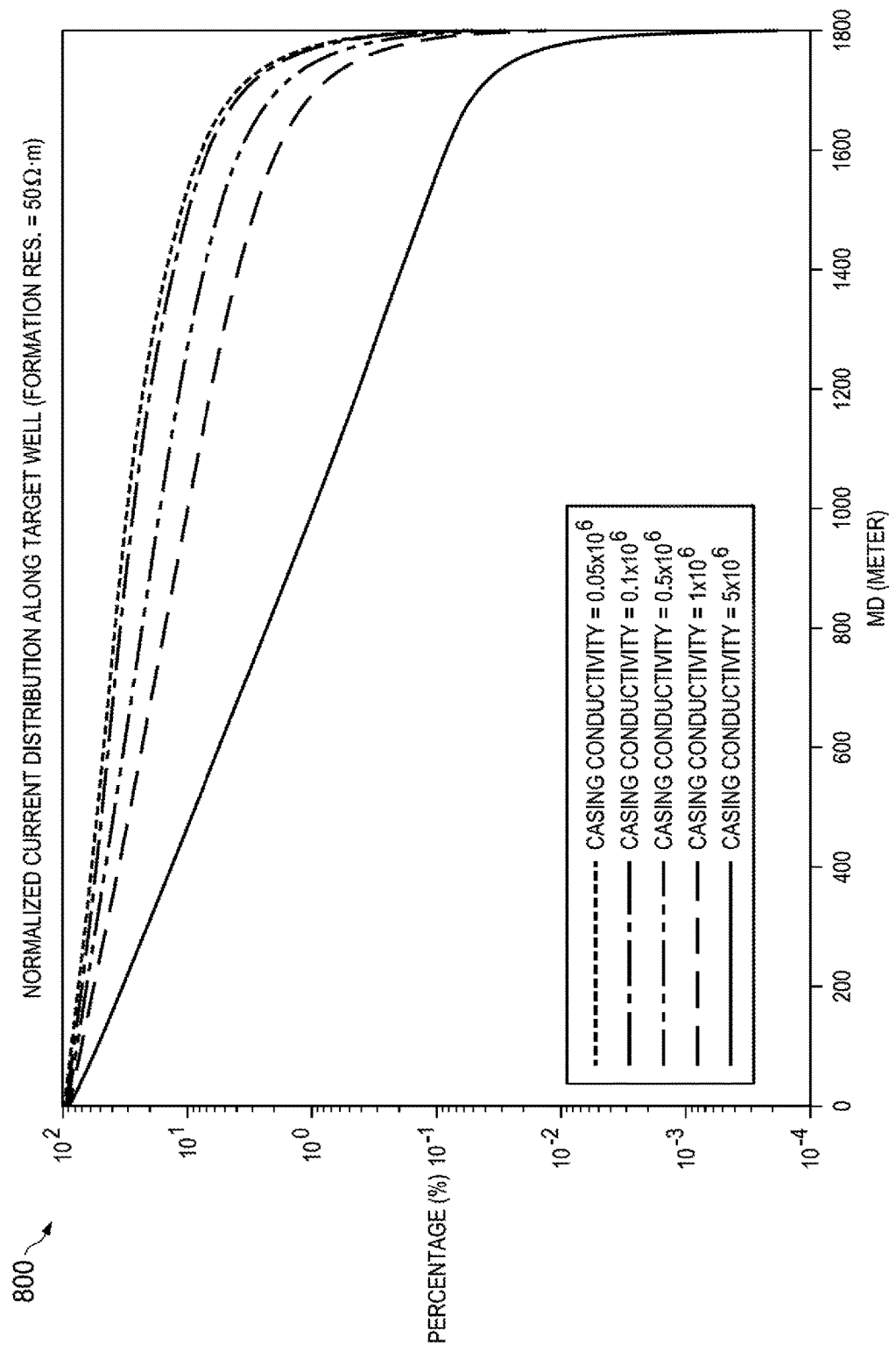
FIG. 8A is a graph showing normalized electrical current distribution of an electrical current flowing along a target well (e.g., cased-hole well) at operating frequency of 10 Hz for different conductivities of a casing pipe deployed in the target well, according to certain illustrative embodiments of the present disclosure.
Figure 8B:
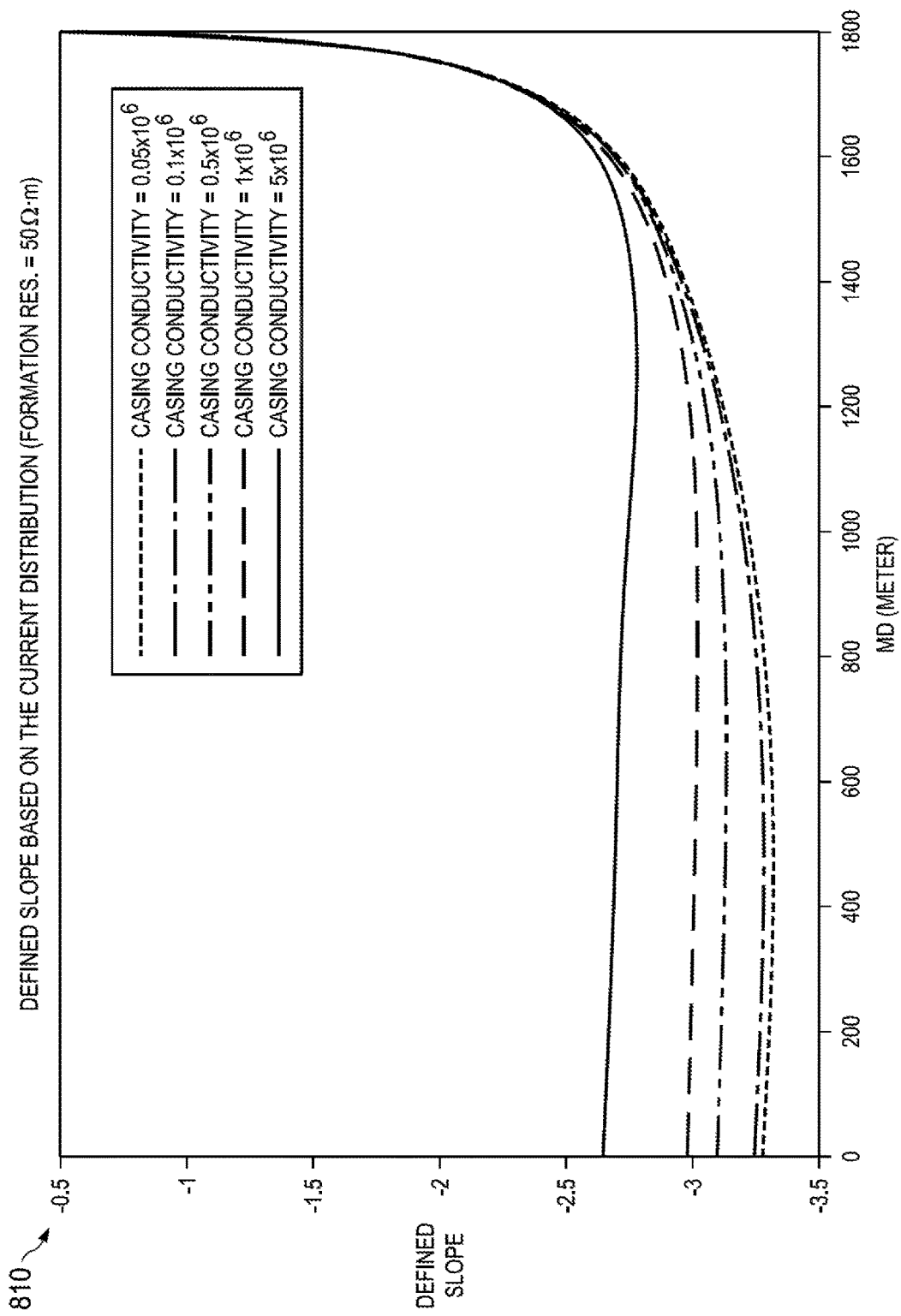
FIG. 8B is a graph showing defined slopes of an electrical current flowing along a target well (e.g., cased-hole well) at operating frequency of 10 Hz for different conductivities of a casing pipe deployed in the target well, according to certain illustrative embodiments of the present disclosure.

FIGS. 8A-8B show modeling responses of electrical current distribution and leakage current rate distribution along a target well when surface excitation is applied to a wellhead of the target well, in accordance with illustrative embodiments of the present disclosure. In one or more embodiments, the modeling responses illustrated in FIGS. 8A-8B may be obtained by employing a modeling code stored in a non-transitory storage medium (e.g., non-transitory information storage media 142 of the drilling environment 100 illustrated in FIG. 1). The graph 800 of FIG. 8A shows the normalized electrical current distribution (e.g., normalized by a surface amplitude of an electrical current generated by a power supply located at a surface, such as the power supply 148 of the drilling environment 100 illustrated in FIG. 1) along the target well with respect to different casing conductivities. The graph 810 of FIG. 8B illustrates electrical current slopes (i.e., electrical current leakage rates) corresponding to the electrical current distribution shown in the graph 800 of FIG. 8A for different casing conductivities. The operating frequency is 10 Hz, the target well length is 1800 meters, and formation resistivity is 50 Ω·m. For some illustrative embodiments, as discussed, the slope (e.g., leakage rate) illustrated in the graph 810 of FIG. 8B can be defined by equation (8a).

As shown in the graph 810 of FIG. 8B, at shallow depth range (e.g., well depths from 0 to 1000 meters), the slope (leakage rate) is flat and unique for a particular formation resistivity. After 1000 meters, the slope (leakage rate) still has a significant difference among high conductivity pipes (e.g., conductivity greater than $10^5$ S) but becomes less sensitive to low conductivity pipes (e.g., conductivity of $10^5$ S or less). After 1600 meters, all conductivity cases illustrated in the graph 810 of FIG. 8B have very similar values of defined slope due to so-called "end of pipe effect" where electrical current signal along the target well becomes very small when approaching the end of the target well. At the end of the cased-hole well, the discontinuity of pipe conductivity leads to significant decrease of the electrical current near the end of the well, which can be observed at the graph 800 of FIG. 8A.

For some illustrative embodiments, as discussed, a leakage rate (slope) of an electrical current flowing along a wellbore of a target well penetrating a homogeneous reservoir formation, away from termination of pipe, surface and return electrode, can be calculated based on a magnitude of the electrical current given by using equation (9). Therefore, the method for determining the pipe resistance based directly on the leakage rate of the electrical current flowing along the casing pipe of the target well is only applicable when the electrical current signal is far away from the end of the target well. In one or more embodiments, the pipe resistance can be directly calculated based on an electrical current magnitude as a function of the measured depth defined by equation (9a) as:

$$R_{pipe} = R_f \left( \frac{\log(I(z_1)/I(z_2))}{z_1 - z_2} \right)^2, \quad (11a)$$

where $z_1$ is a first measure depth, and $z_2$ is a second measure depth. Thus, if formation resistivity can be determined by resistivity measurements from another logging tool near ranging sensors, the corresponding ranging measurements are able to estimate pipe resistance using equation (11a) and/or the modeling responses illustrated in FIGS. 8A-8B. In one or more other embodiments, the pipe resistance can be directly calculated based on an electrical current magnitude as a function of frequency defined by equation (9b) as:

$$R_{pipe} = \frac{\sqrt{\mu R_f}}{\left( \frac{\log(I(f_1)/I(f_2))}{f_1 - f_2} \right)}, \quad (11b)$$

where $I(f_1)$ is a magnitude of the electrical current for a first operating frequency of the electrical current $f_1$ and $I(f_2)$ is a magnitude of the electrical current for a second operating frequency of the electrical current $f_2$.

Figure 9A:
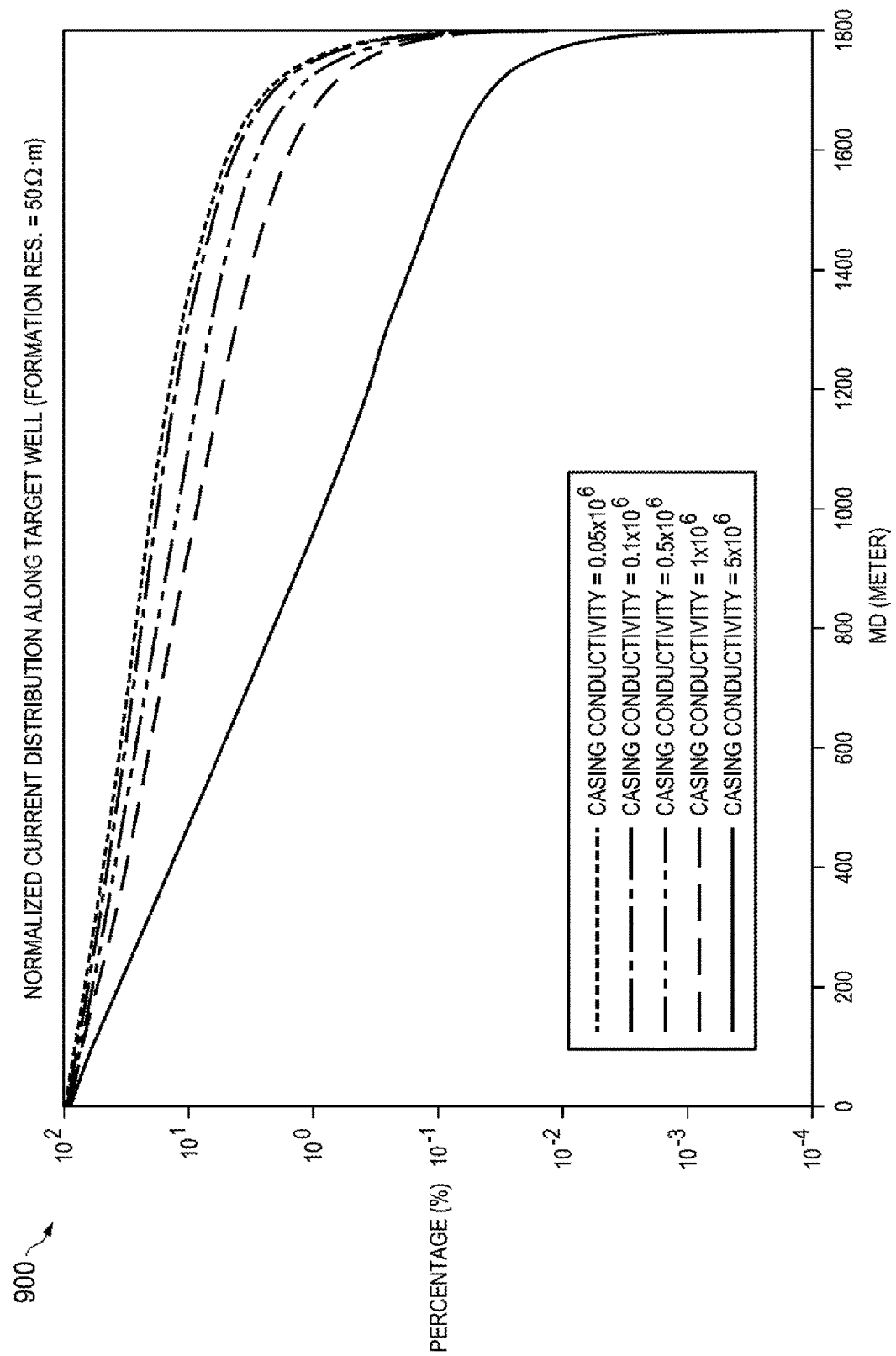
FIG. 9A is a graph showing normalized distribution of an electrical current flowing along a target well (e.g., cased-hole well) at operating frequency of 30 Hz for different conductivities of a casing pipe deployed in the target well, according to certain illustrative embodiments of the present disclosure.
Figure 9B:
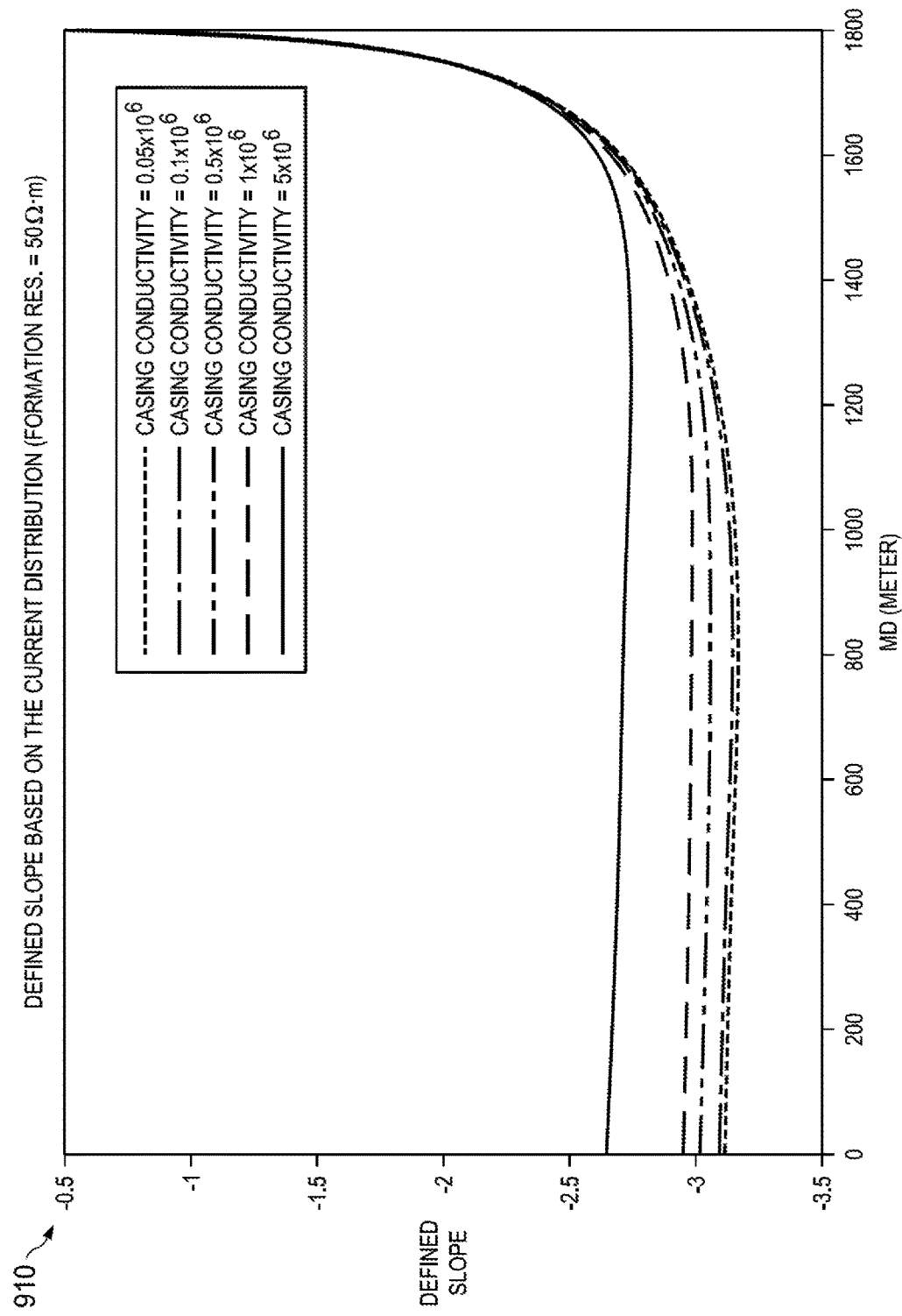
FIG. 9B is a graph showing defined slopes of an electrical current flowing along a target well (e.g., cased-hole well) at operating frequency of 30 Hz for different conductivities of a casing pipe deployed in the target well, according to certain illustrative embodiments of the present disclosure.

For certain embodiments of the present disclosure, in order to improve estimation of pipe properties, multi-frequency measurements may be utilized to enhance the estimation on pipe resistance. FIGS. 9A-9B show modeling responses of electrical current distribution and leakage current rate distribution along a target well when surface excitation is applied to a wellhead of the target well, having the same modeling parameters as in FIGS. 8A-8B but a different operating frequency of 30 Hz. In one or more embodiments, the modeling responses illustrated in FIGS. 9A-9B may be obtained by employing a modeling code stored in a non-transitory storage medium (e.g., non-transitory information storage media 142 of the drilling environment 100 illustrated in FIG. 1). The graph 900 of FIG. 9A shows the normalized electrical current distribution (e.g., normalized by a surface amplitude of an electrical current generated by a power supply located at a surface, such as the power supply 148 of the drilling environment 100 illustrated in FIG. 1) along the target well with respect to different casing conductivities. The graph 910 of FIG. 9B illustrates electrical current slopes (i.e., electrical current leakage rates) corresponding to the electrical current distribution shown in the graph 900 of FIG. 9A for different casing conductivities. In one or more embodiments, both frequency measurements illustrated in FIGS. 8A-8B and FIGS. 9A-9B can distinguish among different pipe conductivities when formation resistivity is known and equal to 50 Ω·m.

Certain embodiments of the present disclosure relate to determining pipe properties using ranging measurements based on surface excitation where an electrical current is injected to a wellhead of a target well. However, the method and system presented herein can be also applicable to any kind of excitation, including downhole excitation, BHA excitation, and the like, as long as electrical current signals flowing along the casing pipe of the target well are efficiently generated.

In one or more embodiments, at higher operating frequencies, permeability of the pipe can be also a factor that determines the electrical current leakage, which can be used to determine the permeability of the pipe if the conductivity and thickness of the pipe is known. At low operating frequencies, conductance and thickness of a single pipe can be relevant to pipe resistivity through the following formula:

$$R_{pipe} = \frac{1}{\pi(r_o^2 - r_i^2)\sigma_{pipe}}, \quad (12)$$

where $r_o$ is an outer radius of the pipe, $r_i$ is an inner radius of the pipe, and $\sigma_{pipe}$ is a conductivity of the pipe material. Equation (12) can be used to calculate either the thickness of the pipe or the conductivity of the pipe, given the other parameter is known.

Figure 10:
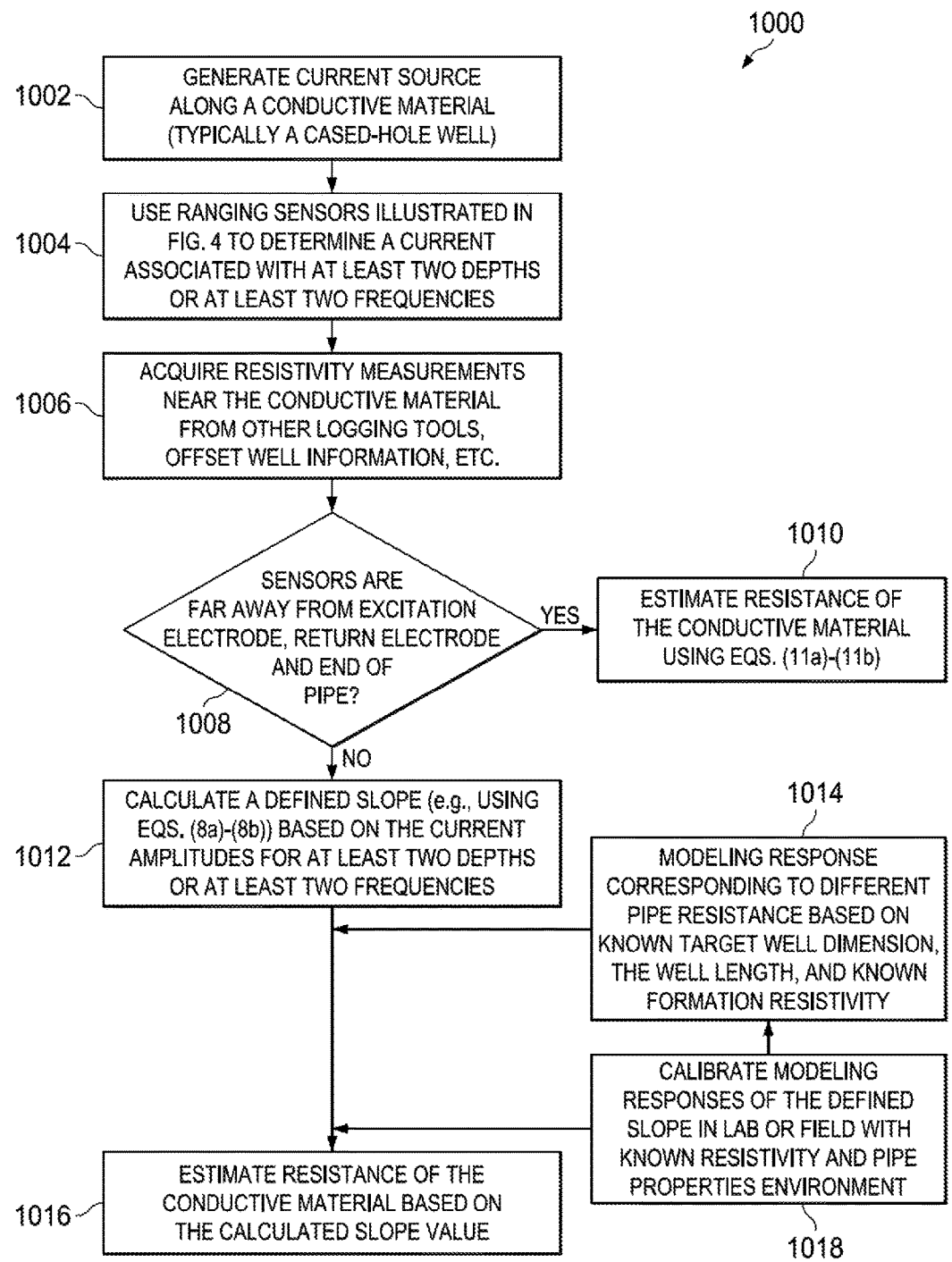
FIG. 10 is a flow chart of a method for decoupling properties of a conductive material (e.g., resistance of a casing pipe) deployed in a target well (e.g., cased-hole well) using ranging measurements, according to certain illustrative embodiments of the present disclosure.

FIG. 10 is a flow chart 1000 of a method for decoupling properties of a conductive material (e.g., resistance of a casing pipe) deployed in a target well (e.g., cased-hole well) using ranging measurements and electrical current leakage rate, according to certain illustrative embodiments of the present disclosure. At 1002, using a current source, an electrical current signal may be generated that flows along a conductive material deployed in a target well (e.g., a casing pipe of the target well). For some illustrative embodiments, as discussed, the current source may be related to surface excitation, downhole excitation, BHA excitation, and the like, whereas the conductive material whose properties are being determined is associated with a cased-hole well, a drilling well with conductive BHA, and the like. At 1004, ranging sensors attached to a ranging tool in the drilling well (e.g., sensors S1 and S2 illustrated in FIG. 4) may be used to determine amplitudes of an electrical current flowing along the conductive material deployed in the target well (e.g., casing pipe of the target well) for at least two depths of the target well or at least two frequencies of the electrical current. At 1006, resistivity measurements surrounding the conductive material (e.g., formation resistivity, mud resistivity, cement resistivity, and the like) may be obtained from other logging tools and/or from offset well information. At 1008, it may be determined that sensor location is far away from the excitation electrode, return electrode and termination of the target well. Then, at 1010, equation (11a) may be used to directly estimate a resistance of the conductive material based on a measured leakage rate of the electrical current flowing along the target well (determined from the amplitudes of the electrical current for the at least two depths of the target well). Alternatively, at 1010, equation (11b) may be used to directly estimate a resistance of the conductive material based on a frequency slope of the electrical current flowing along the target well (determined from the amplitudes of the electrical current for the at least two operating frequencies).

However, if it is determined at 1008 that the sensor location is closer to any electrode or termination of the pipe, equations (11a) and (11b) are not valid anymore. Then, at 1012, equation (8a) may be used to calculate a defined slope (e.g., leakage current rate) based on the electrical current amplitudes measured for the at least two depths of the target well. Alternatively, at 1012, equation (8b) may be used to calculate a frequency slope of the electrical current flowing along the conductive material deployed in the target well based on the electrical current amplitudes measured for the at least two frequencies of the electrical current. At 1014, modeling code may be employed to calculate modeling responses of the defined slope (e.g., distinct leakage current rates or distinct frequency slopes) with respect to different pipe resistances based on known properties of the conductive material (e.g., casing pipe) deployed in the target well (e.g., pipe size and length, pipe conductivity and permeability, and the like) and known formation resistivity measurements. At 1016, the modeling responses of the defined slope obtained at 1014 may be compared with the measurement calculations (e.g., the measured slope) obtained at 1012 to estimate resistance of the conductive material (e.g., pipe resistance). In one or more embodiments, an inversion method may be applied at 1016 to accurately estimate the resistance of conductive material by matching the modeling responses obtained at 1014 with the measurements obtained at 1012. Additionally, at 1018, lab data or field data may be used to calibrate the modeling responses of the defined slope in real-time processing and/or post-processing schemes with known formation resistivity and pipe properties.

The methods and systems presented in this disclosure may be further employed to estimate physical dimensions of a pipe in a target well. If the pipe conductivity as well as all resistivity measurements are known, then the electrical current leakage rate can be used to determine the physical dimensions of the pipe.

Certain embodiments of the present disclosure further relate to ranging measurements conducted for a plurality of different operating frequencies of an electrical current flowing along a target well. In one or more embodiments, the electrical current flowing along the target well is DC signal, i.e., the operating frequency of the electrical current can be frequency of 0 Hz. Ranging measurements for each of the plurality of frequencies may be used to determine measurements of electrical current amplitudes for different depths, i.e., at least one leakage current rate may be determined for each of the plurality of frequencies of the electrical current flowing along the target well. In one or more embodiments, a modeling code may be employed to calculate, for at least one frequency of the plurality of frequencies, distinct leakage current rates with respect to different formation property values (e.g., formation resistivity values) based on certain known properties (e.g., pipe size and length, pipe conductivity and permeability, and the like). Further, the modeling code may be also employed to calculate, for at least one other frequency of the plurality of frequencies, distinct leakage current rates with respect to different pipe property values (e.g., pipe resistance values). The modeling responses may be then compared with the leakage current rates measured for at least two frequencies of the electrical current flowing along the target well to estimate both a property (e.g., resistivity) of a formation surrounding the target well and a property (e.g., resistance) of a conductive material (e.g., casing pipe) deployed in the target well.

Figure 11:
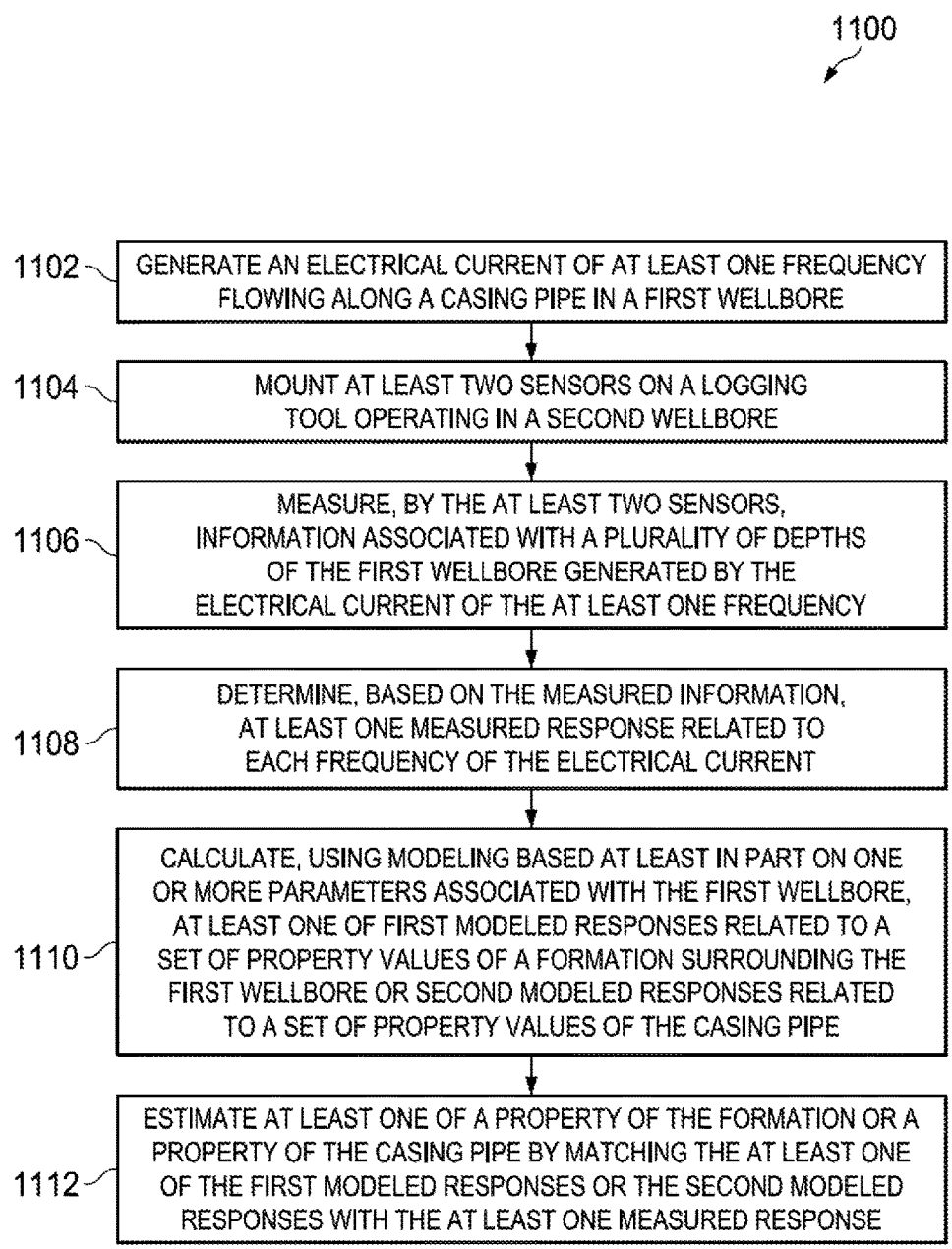
FIG. 11 is a flow chart of a method for estimating properties of a formation surrounding a target well (e.g., cased-hole well) and/or properties of a conductive material deployed in the target well using ranging measurements, according to certain illustrative embodiments of the present disclosure.

Discussion of an illustrative method of the present disclosure will now be made with reference to FIG. 11, which is a flow chart 1100 of a method for estimating properties of a formation surrounding a target well (e.g., cased-hole well, such as target well 128 of the drilling environment 100 illustrated in FIG. 1) and/or properties of a conductive material (e.g., casing pipe) deployed in the target well using ranging measurements, according to certain illustrative embodiments of the present disclosure. The method begins at 1102 by generating an electrical current (e.g., by power supply 148 in FIG. 1) of at least one frequency flowing along a casing pipe (e.g., casing 152 in FIG. 1) in a first wellbore (e.g., target well 128 in FIG. 1). At 1104, at least two sensors (e.g., sensors S1 and S2 illustrated in FIG. 4) may be mounted on a logging tool (e.g., ranging tool 124 in FIG. 1) operating in a second wellbore (e.g., drilling well 126). At 1106, the at least two sensors may measure information (e.g., magnetic field strength, gradient field strength and ranging distance between drilling well 126 and the target well 128) associated with a plurality of depths of the first wellbore generated by the electrical current of the at least one frequency. At 1108, based on the measured information, at least one measured response (e.g., electrical current amplitudes and/or leakage current rates) related to each frequency of the electrical current may be determined. At 1110, at least one of first modeled responses (e.g., electrical current distribution and/or leakage current rate distribution) related to a set of property values (e.g., resistivity values) of a formation surrounding the first wellbore or second modeled responses (e.g., electrical current distribution and/or leakage current rate distribution) related to a set of property values (e.g., resistance or conductivity values) of the casing pipe may be calculated, using modeling (e.g., using a modeling code stored in a memory interfaced with a processor configured to perform the operations of method 1100 of FIG. 11) based at least in part on one or more parameters associated with the first wellbore (e.g., at least one of: a length of the first wellbore, a size and length of the casing pipe, conductivity of the casing pipe, permeability of the casing pipe, or resistivity measurements of the formation). At 1112, at least one of a property of the formation (e.g., formation resistivity) or a property of the casing pipe (e.g., pipe resistance) may be estimated by matching (e.g., by an inversion method) the at least one of the first modeled responses or the second modeled responses with the at least one measured response.

Figure 12:
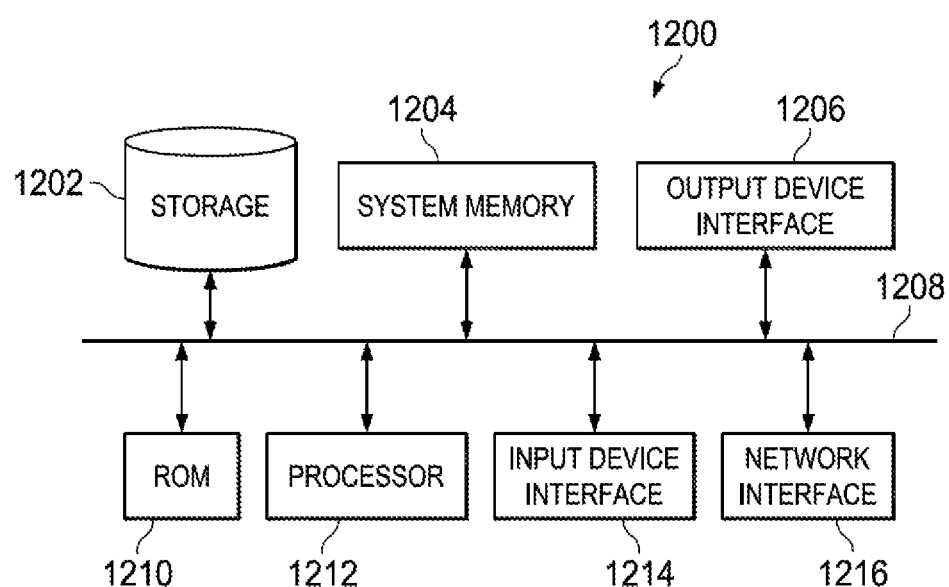
FIG. 12 is a block diagram of an illustrative computer system in which embodiments of the present disclosure may be implemented.

FIG. 12 is a block diagram of an illustrative computing system 1200 (e.g., computing system 140 of FIG. 1, some other processing device located downhole, etc.) in which illustrative embodiments of the present disclosure may be implemented adapted for estimating properties of a formation surrounding a target well and/or properties of a conductive material (e.g., casing pipe) deployed in the target well using ranging measurements. For example, some of the operations of method 700 of FIG. 7, some of the operations of method 1000 of FIG. 10, and some of the operations of method 1100 of FIG. 11, as described above, may be implemented using the computing system 1200 (also illustrated in FIG. 1 as computing system 140). The computing system 1200 can be a computer, phone, personal digital assistant (PDA), or any other type of electronic device. Such an electronic device includes various types of computer readable media and interfaces for various other types of computer readable media. As shown in FIG. 12, the computing system 1200 includes a permanent storage device 1202, a system memory 1204, an output device interface 1206, a system communications bus 1208, a read-only memory (ROM) 1210, processing unit(s) 1212, an input device interface 1214, and a network interface 1216.

In one or more embodiments, the ranging tool 124 and/or the ranging determination module RD of the drill string 108 associated with the drilling well 126 illustrated in FIG. 1 may comprise sensors S1 and S2 illustrated in FIG. 4 configured to perform ranging measurements. As discussed, the ranging tool 124 and/or the ranging determination module RD may obtain measurements related to magnetic field strength, gradient field strength and ranging distance between the drilling well 126 and the target well 128. These measurements may be communicated (e.g., via telemetry sub 132) in a digital form to, for example, computing system 140 (computing system 1200 in FIG. 12). The computing system 140 (e.g., processing unit 1212 of computing system 1200 illustrated in FIG. 12) may then determine, based on the communicated measurements, amplitudes at different well depths of electrical current flowing along casing 152 of the target well 128.

Further, the computing system 140 (e.g., processing unit 1212 of computing system 1200 illustrated in FIG. 12) may calculate one or more leakage current rates based on the electrical current amplitudes for different well depths. The modeling code (e.g., stored on non-transitory information storage media 142 of the drilling environment 100 illustrated in FIG. 1, or on ROM 1210 of computing system 1200 illustrated in FIG. 12) may be then run to calculate distinct modeled leakage current rates with respect to different formation resistivities and/or different casing pipe resistances based on certain known parameters associated with a target well. Then, computing system 140 (e.g., processing unit 1212 of computing system 1200 illustrated in FIG. 12) may compare (e.g., match by an inversion method) the modeling responses with the previously obtained measured leakage current rates in order to estimate properties (e.g., resistivity) of a formation surrounding a target well (e.g., the target well 128 in FIG. 1) and/or properties (e.g., resistance) of a casing pipe deployed in the target well (e.g., casing 152 of the target well 128 in FIG. 1).

For certain embodiments, the estimated properties of the formation and the casing pipe may be further analyzed and processed by the computer 140 (e.g., processing unit 1212 of computing system 1200 illustrated in FIG. 12) to generate a display of useful information on computer monitor 146 or some other form of a display device. For some illustrative embodiments, a driller could employ this system to obtain and monitor formation properties and formation boundaries, which may be used to initiate steering commands from the surface to the bottom-hole assembly for drilling of a wellbore (e.g., wellbore 116 of drilling well 126 illustrated in FIG. 1). For some other illustrative embodiments, an operator may employ this system to obtain and monitor properties of a casing pipe (e.g., casing 152 of the target well 128 illustrated in FIG. 1), which may be used to initiate repair of defects or other mechanical deformations on the casing pipe.

The bus 1208 collectively represents all system, peripheral, and chipset buses that communicatively connect the numerous internal devices of the computing system 1200. For instance, the bus 1208 communicatively connects the processing unit(s) 1212 with the ROM 1210, the system memory 1204, and the permanent storage device 1202.

From these various memory units, the processing unit(s) 1212 retrieves instructions to execute and data to process in order to execute the processes of the subject disclosure. The processing unit(s) can be a single processor or a multi-core processor in different implementations.

The ROM 1210 stores static data and instructions that are needed by the processing unit(s) 1212 and other modules of the computing system 1200. The permanent storage device 1202, on the other hand, is a read-and-write memory device. This device is a non-volatile memory unit that stores instructions and data even when the computing system 1200 is off. Some implementations of the subject disclosure use a mass-storage device (such as a magnetic or optical disk and its corresponding disk drive) as the permanent storage device 1202.

Other implementations use a removable storage device (such as a floppy disk, flash drive, and its corresponding disk drive) as the permanent storage device 1202. Like the permanent storage device 1202, the system memory 1204 is a read-and-write memory device. However, unlike the storage device 1202, the system memory 1204 is a volatile read-and-write memory, such a random access memory. The system memory 1204 stores some of the instructions and data that the processor needs at runtime. In some implementations, the processes of the subject disclosure are stored in the system memory 1204, the permanent storage device 1202, and/or the ROM 1210. For example, the various memory units include instructions for computer aided pipe string design based on existing string designs in accordance with some implementations. From these various memory units, the processing unit(s) 1212 retrieves instructions to execute and data to process in order to execute the processes of some implementations.

The bus 1208 also connects to the input and output device interfaces 1214 and 1206. The input device interface 1214 enables the user to communicate information and select commands to the computing system 1200. Input devices used with the input device interface 1214 include, for example, alphanumeric, QWERTY, or T9 keyboards, microphones, and pointing devices (also called "cursor control devices"). The output device interfaces 1206 enables, for example, the display of images generated by the computing system 1200. Output devices used with the output device interface 1206 include, for example, printers and display devices, such as cathode ray tubes (CRT) or liquid crystal displays (LCD). Some implementations include devices such as a touchscreen that functions as both input and output devices. It should be appreciated that embodiments of the present disclosure may be implemented using a computer including any of various types of input and output devices for enabling interaction with a user. Such interaction may include feedback to or from the user in different forms of sensory feedback including, but not limited to, visual feedback, auditory feedback, or tactile feedback. Further, input from the user can be received in any form including, but not limited to, acoustic, speech, or tactile input. Additionally, interaction with the user may include transmitting and receiving different types of information, e.g., in the form of documents, to and from the user via the above-described interfaces.

Also, as shown in FIG. 12, the bus 1208 also couples the computing system 1200 to a public or private network (not shown) or combination of networks through a network interface 1216. Such a network may include, for example, a local area network ("LAN"), such as an Intranet, or a wide area network ("WAN"), such as the Internet. Any or all components of the computing system 1200 can be used in conjunction with the subject disclosure. Again, although described in relation to computer system 140, the processing circuitry of the present disclosure may also be located downhole in alternate embodiments.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself. Accordingly, some of the operations of method 700 of FIG. 7, some of the operations of method 1000 of FIG. 10, and some of the operations of method 1100 of FIG. 11, as described above, may be implemented using the computing system 1200 of FIG. 12 or any computer system having processing circuitry or a computer program product including instructions stored therein, which, when executed by at least one processor, causes the processor to perform functions relating to these methods.

As used in this specification and any claims of this application, the terms "computer", "server", "processor", and "memory" all refer to electronic or other technological devices. These terms exclude people or groups of people. As used herein, the terms "computer readable medium" and "computer readable media" refer generally to tangible, physical, and non-transitory electronic storage mediums that store information in a form that is readable by a computer.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs implemented on the respective computers and having a client-server relationship to each other. In some embodiments, a server transmits data (e.g., a web page) to a client device (e.g., for purposes of displaying data to and receiving user input from a user interacting with the client device). Data generated at the client device (e.g., a result of the user interaction) can be received from the client device at the server.

It is understood that any specific order or hierarchy of operations in the processes disclosed is an illustration of exemplary approaches. Based upon design preferences, it is understood that the specific order or hierarchy of operations in the processes may be rearranged, or that all illustrated operations be performed. Some of the operations may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, the illustrative methods described herein may be implemented by a system including processing circuitry or a computer program product including instructions which, when executed by at least one processor, causes the processor to perform any of the methods described herein.

A method for estimating formation properties and casing (pipe) properties has been described and may generally include: generating an electrical current of at least one frequency flowing along a casing pipe in a first wellbore; mounting at least two sensors on a logging tool operating in a second wellbore; measuring, by the at least two sensors, information associated with a plurality of depths of the first wellbore generated by the electrical current of the at least one frequency; determining, based on the measured information, at least one measured response related to each frequency of the electrical current; calculating, using modeling based at least in part on one or more parameters associated with the first wellbore, at least one of first modeled responses related to a set of property values of a formation surrounding the first wellbore or second modeled responses related to a set of property values of the casing pipe; and estimating at least one of a property of the formation or a property of the casing pipe by matching the at least one of the first modeled responses or the second modeled responses with the at least one measured response.

For the foregoing embodiments, the method may include any one of the following operations, alone or in combination with each other: Determining amplitudes of the electrical current for at least two depths of the first wellbore based on the information measured by the at least two sensors; Estimating a resistance of the casing pipe based on at least one of conductivity of the casing pipe, permeability of the casing pipe, dimensions of the casing pipe, conductivity of a mud associated with the first wellbore, or the least one frequency of the electrical current; Calculating a resistivity of the formation based on the amplitudes of the electrical current and the estimated resistance of the casing pipe; Determining amplitudes of the electrical current for at least two depths of the first wellbore based on the information measured by the at least two sensors; Determining a resistivity of the formation based on resistivity measurements from another logging tool near the at least two sensors; Calculating a resistance of the casing pipe based on the amplitudes of the electrical current and the determined resistivity of the formation; Initiating adjustment of drilling operation in the second wellbore based on the estimated property of the formation; Initiating repair of defects or mechanical deformations on the casing pipe based on the estimated property of the casing pipe.

The at least one measured response comprises at least one measured leakage current rate related to each frequency of the electrical current; The first modeled responses comprise a first plurality of leakage current rates obtained by using the modeling and related to one or more frequencies of the electrical current; The second modeled responses comprise a second plurality of leakage current rates obtained by using the modeling and related to one or more other frequencies of the electrical current; The information measured by the at least two sensors comprise a magnetic field strength and a gradient field strength for each frequency of the electrical current for each depth of the plurality of depths;

Likewise, a system for estimating formation properties and casing properties has been described and includes: an electrical current source or a voltage source configured to generate an electrical current of at least one frequency flowing along a casing pipe in a first wellbore; at least two sensors attached to a logging tool operating in a second wellbore, wherein the at least two sensors are configured to measure information associated with a plurality of depths of the first wellbore generated by the electrical current of the at least one frequency; at least one processor; and a memory coupled to the processor having instructions stored therein, which when executed by the processor, cause the processor to perform functions, including functions to: determine, based on the measured information, at least one measured response related to each frequency of the electrical current; calculate, using modeling based at least in part on one or more parameters associated with the first wellbore, at least one of first modeled responses related to a set of property values of a formation surrounding the first wellbore or second modeled responses related to a set of property values of the casing pipe; and estimate at least one of a property of the formation or a property of the casing pipe by matching the at least one of the first modeled responses or the second modeled responses with the at least one measured response.

For any of the foregoing embodiments, the system may include any one of the following elements, alone or in combination with each other: the functions performed by the processor include functions to determine amplitudes of the electrical current for at least two depths of the first wellbore based on the information measured by the at least two sensors, estimate a resistance of the casing pipe based on at least one of conductivity of the casing pipe, permeability of the casing pipe, dimensions of the casing pipe, conductivity of a mud associated with the first wellbore, or the least one frequency of the electrical current, and calculate a resistivity of the formation based on the amplitudes of the electrical current and the estimated resistance of the casing pipe; the functions performed by the processor include functions to determine amplitudes of the electrical current for at least two depths of the first wellbore based on the information measured by the at least two sensors, determine a resistivity of the formation based on resistivity measurements from another logging tool near the at least two sensors, and calculate a resistance of the casing pipe based on the amplitudes of the electrical current and the determined resistivity of the formation; the functions performed by the processor include functions to calculate a thickness of the casing pipe based on the resistance of the casing pipe and a conductivity of the casing pipe; the functions performed by the processor include functions to calculate a conductivity of the casing pipe based on the resistance of the casing pipe and a thickness of the casing pipe; the functions performed by the processor include functions to calibrate the second modeled responses related to the set of property values of the casing pipe based on at least one of: a size and length of the casing pipe, conductivity of the casing pipe, permeability of the casing pipe, or resistivity measurements of the formation; the functions performed by the processor include functions to initiate adjustment of drilling operation in the second wellbore based on the estimated property of the formation; the functions performed by the processor include functions to initiate repair of defects or mechanical deformations on the casing pipe based on the estimated property of the casing pipe.

The at least one measured response comprises at least one measured current amplitude related to each frequency of the electrical current; The first modeled responses comprise a first plurality of current amplitudes obtained by using the modeling and related to one or more frequencies of the electrical current; The second modeled responses comprise a second plurality of current amplitudes obtained by using the modeling and related to one or more other frequencies of the electrical current; The one or more parameters associated with the first wellbore comprise at least one of: a length of the first wellbore, a size and length of the casing pipe, conductivity of the casing pipe, permeability of the casing pipe, or resistivity measurements of the formation; The electrical current source is located above ground, downhole in the first wellbore, or attached to BHA operating in the first wellbore; The electrical current of the at least one frequency comprises a DC signal.

Embodiments of the present disclosure utilize ranging measurements to decouple formation properties surrounding a target well. The ranging measurements are typically operated at a very low frequency, and the resolution of decoupled formation resistivity may be low. Still, such ranging measurements may be able to distinguish different formation resistivities within certain resistivity range (e.g., less than 5000 $\Omega \cdot m$). The estimated formation resistivities may be used by a well operator to adjust drilling of a well in a vicinity of a target well (e.g., in SAGD application).

Embodiments of the present disclosure further utilize ranging measurements to estimate properties of a conductive material (e.g., casing pipe) deployed in a target well based on known resistivity measurements from reference tools or offset well information. The method and system presented in this disclosure represents a novel approach to inspect integrity of pipes and detect corrosion, buckling, disconnections or any other physical or electrical deformations.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

While specific details about the above embodiments have been described, the above hardware and software descriptions are intended merely as example embodiments and are not intended to limit the structure or implementation of the disclosed embodiments. For instance, although many other internal components of computer system 1200 illustrated in FIG. 12 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the Figures illustrate the architecture, functionality, and operation of possible implementations of systems, methods and computer program products according to various embodiments of the present disclosure. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above specific example embodiments are not intended to limit the scope of the claims. The example embodiments may be modified by including, excluding, or combining one or more features or functions described in the disclosure.

What is claimed is:

1. A system for estimating formation properties and casing properties, the system comprising:

an electrical current source or a voltage source configured to generate an electrical current of at least one frequency flowing along a casing pipe in a first wellbore;

at least two sensors attached to a logging tool operating in a second wellbore, wherein the at least two sensors are configured to measure information associated with a plurality of depths of the first wellbore generated by the electrical current of the at least one frequency;

at least one processor; and a memory coupled to the processor having instructions stored therein, which when executed by the processor, cause the processor to perform functions, including functions to:

determine, based on the measured information, at least one measured response related to each frequency of the electrical current;

calculate, using modeling based at least in part on one or more parameters associated with the first wellbore, at least one of first modeled responses related to a set of property values of a formation surrounding the first wellbore or second modeled responses related to a set of property values of the casing pipe; and estimate at least one of a property of the formation or a property of the casing pipe by matching the at least one of the first modeled responses or the second modeled responses with the at least one measured response.

2. The system of claim 1, wherein:

the at least one measured response comprises at least one measured leakage current rate related to each frequency of the electrical current;

the first modeled responses comprise a first plurality of leakage current rates obtained by using the modeling and related to one or more frequencies of the electrical current; and the second modeled responses comprise a second plurality of leakage current rates obtained by using the modeling and related to one or more other frequencies of the electrical current.

3. The system of claim 1, wherein:

the at least one measured response comprises at least one measured current amplitude related to each frequency of the electrical current;

the first modeled responses comprise a first plurality of current amplitudes obtained by using the modeling and related to one or more frequencies of the electrical current; and the second modeled responses comprise a second plurality of current amplitudes obtained by using the modeling and related to one or more other frequencies of the electrical current.

4. The system of claim 1, wherein the information measured by the at least two sensors comprise a magnetic field strength and a gradient field strength for each frequency of the electrical current for each depth of the plurality of depths.

5. The system of claim 1, wherein the one or more parameters associated with the first wellbore comprise at least one of: a length of the first wellbore, a size and length of the casing pipe, conductivity of the casing pipe, permeability of the casing pipe, or resistivity measurements of the formation.

6. The system of claim 1, wherein the functions performed by the processor include functions to:
- determine amplitudes of the electrical current for at least two depths of the first wellbore based on the information measured by the at least two sensors;
- estimate a resistance of the casing pipe based on at least one of conductivity of the casing pipe, permeability of the casing pipe, dimensions of the casing pipe, conductivity of a mud associated with the first wellbore, or the least one frequency of the electrical current; and
- calculate a resistivity of the formation based on the amplitudes of the electrical current and the estimated resistance of the casing pipe.

7. The system of claim 1, wherein the functions performed by the processor include functions to:
- determine amplitudes of the electrical current for at least two depths of the first wellbore based on the information measured by the at least two sensors;
- determine a resistivity of the formation based on resistivity measurements from another logging tool near the at least two sensors; and
- calculate a resistance of the casing pipe based on the amplitudes of the electrical current and the determined resistivity of the formation.

8. The system of claim 7, wherein the functions performed by the processor include functions to calculate a thickness of the casing pipe based on the resistance of the casing pipe and a conductivity of the casing pipe.

9. The system of claim 7, wherein the functions performed by the processor include functions to calculate a conductivity of the casing pipe based on the resistance of the casing pipe and a thickness of the casing pipe.

10. The system of claim 1, wherein the electrical current source is located above ground, downhole in the first wellbore, or attached to a bottom hole assembly (BHA) operating in the first wellbore.

11. The system of claim 1, wherein the functions performed by the processor include functions to calibrate the second modeled responses related to the set of property values of the casing pipe based on at least one of: a size and length of the casing pipe, conductivity of the casing pipe, permeability of the casing pipe, or resistivity measurements of the formation.

12. The system of claim 1, wherein the functions performed by the processor include functions to initiate adjustment of drilling operation in the second wellbore based on the estimated property of the formation.

13. The system of claim 1, wherein the functions performed by the processor include functions to initiate repair of defects or mechanical deformations on the casing pipe based on the estimated property of the casing pipe.

14. The system of claim 1, wherein the electrical current of the at least one frequency comprises a DC signal.

15. A method for estimating formation properties and casing properties, the method comprising:
- generating an electrical current of at least one frequency flowing along a casing pipe in a first wellbore;
- mounting at least two sensors on a logging tool operating in a second wellbore;
- measuring, by the at least two sensors, information associated with a plurality of depths of the first wellbore generated by the electrical current of the at least one frequency;
- determining, based on the measured information, at least one measured response related to each frequency of the electrical current;
- calculating, using modeling based at least in part on one or more parameters associated with the first wellbore, at least one of first modeled responses related to a set of property values of a formation surrounding the first wellbore or second modeled responses related to a set of property values of the casing pipe; and
- estimating at least one of a property of the formation or a property of the casing pipe by matching the at least one of the first modeled responses or the second modeled responses with the at least one measured response.

16. The method of claim 15, wherein:
- the at least one measured response comprises at least one measured leakage current rate related to each frequency of the electrical current;
- the first modeled responses comprise a first plurality of leakage current rates obtained by using the modeling and related to one or more frequencies of the electrical current; and
- the second modeled responses comprise a second plurality of leakage current rates obtained by using the modeling and related to one or more other frequencies of the electrical current.

17. The method of claim 15, wherein the information measured by the at least two sensors comprise a magnetic field strength and a gradient field strength for each frequency of the electrical current for each depth of the plurality of depths.

18. The method of claim 15, further comprising:
- determining amplitudes of the electrical current for at least two depths of the first wellbore based on the information measured by the at least two sensors;
- estimating a resistance of the casing pipe based on at least one of conductivity of the casing pipe, permeability of the casing pipe, dimensions of the casing pipe, conductivity of a mud associated with the first wellbore, or the least one frequency of the electrical current; and
- calculating a resistivity of the formation based on the amplitudes of the electrical current and the estimated resistance of the casing pipe.

19. The method of claim 15, further comprising:
- determining amplitudes of the electrical current for at least two depths of the first wellbore based on the information measured by the at least two sensors;
- determining a resistivity of the formation based on resistivity measurements from another logging tool near the at least two sensors; and
- calculating a resistance of the casing pipe based on the amplitudes of the electrical current and the determined resistivity of the formation.

20. The method of claim 15, further comprising initiating adjustment of drilling operation in the second wellbore based on the estimated property of the formation.

21. The method of claim 15, further comprising initiating repair of defects or mechanical deformations on the casing pipe based on the estimated property of the casing pipe.

* * * * *